（12） United States Patent
Osman et al.

(10) Patent No.: US 11,524,245 B2
(45) Date of Patent: Dec. 13, 2022

(54) METHODS AND SYSTEMS FOR IMPROVING SPECTATOR ENGAGEMENT IN A VIDEO GAME

(71) Applicant: Sony Interactive Entertainment Inc., Tokyo (JP)

(72) Inventors: Steven Osman, San Mateo, CA (US); Saket Kumar, San Mateo, CA (US); Yuichiro Nakamura, San Mateo, CA (US); Katrine Chow, San Mateo, CA (US); Xavier Menendez-Pidal, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 155 days.

(21) Appl. No.: 16/906,843

(22) Filed: Jun. 19, 2020

(65) Prior Publication Data

US 2021/0394073 A1 Dec. 23, 2021

(51) Int. Cl.
*A63F 13/00* (2014.01)
*A63F 13/86* (2014.01)
*A63F 13/45* (2014.01)
*A63F 13/87* (2014.01)
*G06N 20/00* (2019.01)

(52) U.S. Cl.
CPC .............. *A63F 13/86* (2014.09); *A63F 13/45* (2014.09); *A63F 13/87* (2014.09); *G06N 20/00* (2019.01); *A63F 2300/577* (2013.01)

(58) Field of Classification Search
CPC ...... A63F 13/355; A63F 13/352; A63F 13/86; A63F 13/56; A63F 13/79
See application file for complete search history.

(56) References Cited

U.S. PATENT DOCUMENTS

| 2017/0001111 | A1  | 1/2017 | Willette et al. |
| 2017/0003784 | A1* | 1/2017 | Garg ........................ A63F 13/87 |
| 2017/0006074 | A1* | 1/2017 | Oates, III ............. H04N 21/472 |
| 2017/0006322 | A1* | 1/2017 | Dury .................... H04N 21/254 |

OTHER PUBLICATIONS

ISR PCT/US2021/030975, dated Aug. 30, 2021, 3 pages.

* cited by examiner

*Primary Examiner* — David L Lewis
*Assistant Examiner* — Eric M Thomas
(74) *Attorney, Agent, or Firm* — Penilla IP, APC

(57) ABSTRACT

Methods and systems for improving engagement metrics of a spectator include identifying a group of spectators watching game play of a video game and generating an aggregate group profile for the group. Engagement metrics for the group are analyzed to identify engagement level of the group toward the game play of the player. One or more suggestions are provided to adjust game play of the video game so as to improve engagement level of the group toward the game play of the video game.

29 Claims, 8 Drawing Sheets

METHODS AND SYSTEMS FOR IMPROVING SPECTATOR ENGAGEMENT IN A VIDEO GAME

TECHNICAL FIELD

The present disclosure relates to providing suggestions to adjust game play of a video game to improve engagement level of the spectators to the game play of a player.

BACKGROUND OF THE DISCLOSURE

Video games have gained popularity in recent years. The video games are of two types. In one type, the video game is executed on a client device (e.g., mobile device, PC, a laptop computer, etc.,) and the client is connected to a server so that metadata related to game play can be shared with the server. Another type of video game is streaming video game, wherein the video game is executed on one or more servers that are part of a game cloud and the game data is streamed to the client device for rendering. Streaming video games, especially, massive multi-player online (MMO) games are more popular as they can be accessed by a vast number of users (e.g., players, spectators, influencers (i.e., a sub-section of users that provide video of the game play of the video game played by a player with commentary provided by the sub-section of users) simultaneously via a network of computers distributed across a wide geography. The MMO games use a lot of resources for executing game logic and require a lot of coordination, in order to provide a satisfactory game play experience to users. In order to ensure the users who are located in different geo locations have access to the video game, the video game is executed on one or more servers of the game cloud system using the resources of the game cloud system. The users are able to connect to the video game executing on the one or more servers of the game cloud system. The advantage of executing the video games on the game cloud system is that the resources required for the execution of the game are centralized.

A player may play the video game and a group of spectators may watch the game play of the player. Depending on the popularity of the game, the expertise of the player, etc., the player may attract few or lot of spectators. Currently, the player may be able to determine the number of spectators that are watching his game play of the video game and not much else about the spectators.

It is in this context that embodiments of the disclosure arise.

SUMMARY

Embodiments of the present disclosure relate to systems and methods for assisting players in determining engagement level of a group of spectators that are watching the game play of an online video game played by the players. Based on the engagement level of the group of spectators, suggestions are provided to the players to assist the players in improving the engagement level of the spectators in the video game. The suggestions to improve the engagement level of the spectators may include requests to the players to perform certain types of actions or certain sequence of actions in the game play, wherein the actions may be identified based on preference of the spectators. Alternatively, the suggestions may be requests to the player to switch to a different video game, or signals to the game engine executing the video game to add or inject additional content/challenges to make the game play more interesting to keep the spectators engaged.

A game cloud system is configured to execute an instance of a video game selected for game play by a player and to identify a group of spectators that are watching the game play of the video game played by the player. The video game may be executing on one or more servers of the game cloud system using resources available at the game cloud system. The spectators may be located in a same geolocation as the player and may be accessing the game play of the player at the game cloud using respective client devices. Alternatively, the spectators may be distributed across different geolocations and accessing the game play of the player at the game cloud system using the respective client devices. In response to detecting the group of spectators, the system generates an aggregate group profile for the group of spectators. The aggregate group profile may include the user profile of the spectators, the spectators preferences, and engagement metrics. The engagement metrics may be identified from the spectators interactions provided on their client devices and/or spectators facial expressions, body movements, actions, etc., captured by one or more sensors associated with the client devices while the spectators are watching game play of the video game that is being streamed to their client devices. The interactions may be related to the video game or may be related to other interactive applications.

The engagement metrics of the group of spectators are analyzed. Based on the analysis, suggestions may be provided to the player or to a game engine of the video game, to adjust game play of the video game. The suggestions may be provided to improve engagement level of the group of spectators toward the game play of the video game.

Game developers and game promoters would like to improve user engagement at a video game, as it can lead to improved revenue (e.g., through sales) for the developers/promoters. Similarly, players may benefit by improving the engagement level of the spectators as it may lead to increased game related revenue stream for the players, wherein the game related revenue may include improved game winnings, game incentives, monetary compensation, etc. Players may be paid or incentivized by game developers, game promoters, and/or sponsors to promote the game. The methods and systems that are described herein provide ways to evaluate the engagement level of the spectators and to assist the player to improve the engagement level of the spectators watching game play of the player.

The spectators in the group may change dynamically with some spectators leaving the group and new spectators joining the group. Changes in the spectator group affect the aggregate group profile of the group, which can lead to change in the engagement level of the group. The system may use machine learning algorithm to keep track of the change in the composition of the group at different times, change in the engagement level of the spectator group, and provide suggestions to the player or generate signals to a game engine executing an instance of the video game to perform certain actions in order to improve the engagement level of the spectators in the group. The machine learning algorithm is used to generate an artificial intelligence (AI) model for the video game of the player. The AI model is trained by progressively updating the nodes using interactions of the spectators and the game play of the player of the video game. The updates to the AI model are used to adjust the outputs that can be used to provide suggestions to improve the engagement metrics of the spectator group. Information from the AI model may be used to determine when the engagement level of the group is waning and to provide suggestions to the player or signals to a game logic of the video game on ways to improve the engagement level of the group.

In addition to suggestions, the system may also provide to the player informative messages or links related to the composition of the spectator group, the engagement metrics of the spectator group, statistics related to the video game, or other content to improve the engagement level of the spectators in the group toward the video game. The suggestions to make changes to the game play of the video game or to content provided for rendering alongside game scene of the video game, are identified based on a group profile of the spectator group. Increasing spectator engagement at the video game played by the player assists the player in improving their own rating, popularity, revenue stream (when compensation is available), etc., which can lead to improved game play satisfaction for the player.

The machine learning algorithm may be part of a prediction engine executing on a game server that is used to execute the video game or executing on a second server that is communicatively connected to the game server that is executing an instance of the video game. The machine learning algorithm generates and dynamically trains the AI model (e.g., a prediction model) using data from the game play session of the player and the interactions of the spectators in the group as the game play of the video game is being rendered on client devices of the spectators in the group. The interactions of the spectators are used to determine engagement metrics of the group. The prediction model includes a plurality of nodes with edges connecting two consecutive nodes. Each node represents one or more characteristics of game play of the player (e.g., actions or sequence of actions performed by the player during game play) or an engagement metric of the group and each edge between any two consecutive nodes identifies a relationship between the corresponding one or more characteristics, engagement metric represented in the corresponding two consecutive nodes. The relationship, for example, may indicate the effect of certain actions provided by the player toward the engagement metrics associated with the group. Output from the prediction model is used to provide suggestions to the player or the game engine to perform certain actions, to cause the spectators to become more engaged in the game play of the video game.

In one implementation, a method is disclosed. The method includes identifying a group of spectators that are watching game play of a video game. The video game generates streaming data based on input provided by a player engaged in game play of the video game. The streaming data is transmitted to a plurality of client devices associated with the player and the group of spectators, for rendering. An aggregate group profile is generated for the group of spectators watching the game play of the video game. The aggregate group profile captures engagement metrics of the spectators in the group. The engagement metrics are analyzed to determine engagement level of the spectators in the group. Data from the analysis is used to provide suggestions to the player to adjust game play of the video game so as to improve engagement level of the group toward the game play of the video game.

In another implementation, a system for improving engagement metrics of a group of spectators watching game play of a video game of a player is disclosed. The system includes a server configured for executing an instance of the video game and for generating frames of data for transmitting to one or more client devices. An encoder is configured to receive the frames of data of the online game and encode the frames of data for transmission. The encoding is done in accordance to specifications of a communication channel established between the server and the respective ones of the client devices associated with the group of spectators and the player. A prediction engine executes on the server and is configured to generate an aggregate group profile of the group of spectators watching the game play of the video game. The generated aggregate group profile captures the engagement metrics of the spectators in the group. The prediction engine is also configured to analyze the engagement metrics of the spectators in the group using machine learning logic to identify engagement level of the group toward the game play of the video game and to provide suggestions to adjust game play of the video game so as to improve engagement level of the group toward the game play of the player.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

Figure 1:
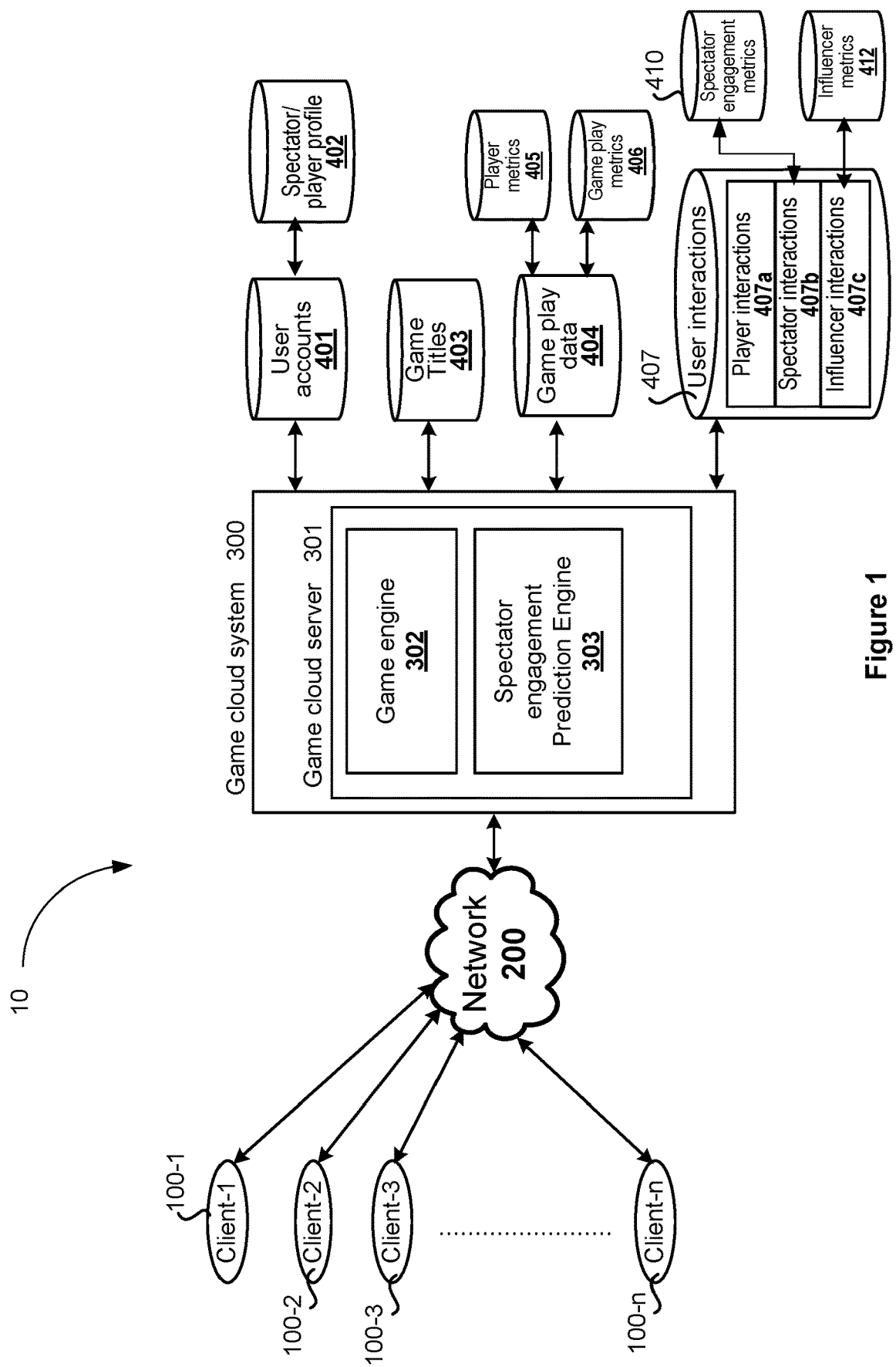
FIG. 1 illustrates a simplified physical view of a game cloud system that is used in generating aggregate group profile of a group of spectators watching game play of a video game and for providing suggestions to the player to adjust game play in order to improve engagement level of the spectators in the group, in accordance with one implementation of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various implementations of the present disclosure describe systems and methods for implementing machine learning algorithm to generate prediction models (i.e., AI models generated using machine learning logic within a prediction engine) for different video games selected for game play by players. The prediction models are trained using interactions provided by the respective group of spectators and inputs provided by the players during game play. The prediction models are then used to determine the engagement level of the spectators in the group and correlate the engagement level to changes occurring in the game play, so that appropriate suggestions may be provided to the respective players or to the respective game engine to adjust game play of the video games to improve engagement level of the spectators in the respective groups. Each prediction model is specific for a video game of a player and is trained with the changes in the engagement metrics detected from the group of spectators that are watching or have selected the video game for watching the game play of the player. The changes in the engagement metrics may be due to changes in the constitution of the group. The group of spectators may change dynamically over time as some of the existing spectators may leave the group and new spectators join the group. Consequently, the engagement metrics of the group may also change dynamically to reflect the changing composition of the group and the prediction model evolves to correlate with the changes detected in the group. Based on the information from the prediction model generated for the game play of the player of the video game, the prediction engine may provide suggestions to adjust game play of the video game. The suggestions may be requests directed toward the player to perform certain types of actions or certain sequence of actions, or signals to the game engine to adjust content (e.g., inject additional content) into the video game or render alongside the video game. The suggestions are specific to the spectator group and specific to the video game, and are provided to enhance the engagement level of the spectators. Enhancing the engagement level of the spectators in the group may lead to improved popularity of the player of the video game, which can lead to improved revenue for the player. It can also enhance the marketability of the video game.

With the general understanding of the inventive embodiments, example details of the various implementations will now be described with reference to the various drawings.

FIG. 1 provides an overview of a system 10 that includes a game cloud system 300 used for providing suggestions to improve engagement metrics of a group of spectators that have selected to watch game play of a video game of a player, in accordance with one implementation. A plurality of client devices 100 (100-1, 100-2, 100-3, . . . 100-n) are used by different users (e.g., players, spectators, influencers (a user who shares game play of a player with commentary provided by the user) to access the game cloud system (GCS) 300 hosting a variety of games, and other interactive application systems hosting social media applications, content provider applications, etc., over a network 200, such as the Internet. The client devices 100 may be accessing the GCS 300 from a single geolocation or from a plurality of geolocations. For example, a player from a first geolocation may select a video game for game play and a group of spectators from the first geolocation may access the video game to watch the game play of the player. In an alternate example, the player may play the video game at the game cloud system 300 by accessing the video game from the first geolocation and the group of spectators from different geolocations may access the video game to view the game play by the player. The client devices 100 can be any type of client computing device having a processor, memory, having LAN, wired, wireless or 5G communication capabilities, and being portable or not portable. For example, the client devices can be smartphones, mobile devices, tablet computers, desktop computers, personal computers, wearable devices, or hybrids or other digital devices that include monitors or touch screens with a portable form factor.

The client devices 100 having 5G communication capabilities may include mobile devices or any other computing devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

The client devices 100 may run an operating system and include network interfaces that provide access to various game applications or interactive applications (apps) available on the game cloud servers in the GCS 300 over the network 200 or could be thin clients with network interface to communicate with the game cloud servers (or simply referred to as "servers") 301, which provide the computation functions. Players may access the GCS 300 using a user account and select a video game available at the GCS 300 for game play, wherein the game play is controlled by the player using control options provided in the client device 100 associated with the player or using controllers that are communicatively connected to the client device 100 of the player. The user account of the player may be verified against user profile data maintained in a user account datastore 401 and against a game titles datastore 403 to ensure that the player is eligible to access and play the video game, prior to providing access to the video game. It is to be noted that although the various embodiments are described in relation to a video game, the embodiments can be extended to include any other interactive applications.

In some implementations, an instance of the video game may be executed remotely on one or more servers 301 disposed in one geolocation or distributed in a plurality of geolocations of the GCS 300 and game play related data from the executing instance of the video game streamed to the various client devices 100 over the network 200. In other implementations, the video games may be executed locally at the client devices 100 and metadata from the executing video game may be transmitted over the network 200 to the game cloud server(s) 301 of the GCS 300 for affecting the game state. Game play data collected from the player's game play session for the video game is used to create a prediction model (i.e., an artificial intelligence (AI) model). The prediction model is trained using interactions provided by the spectators and the game inputs provided by the player. The interactions provided by the spectators may be used to provide suggestions to the player or to a game engine to adjust game play of the video game to improve the engagement level of the spectators. In addition to the suggestions, the prediction model may identify and provide details of select ones of the engagement metrics of the group of spectators, details related to aggregate group profile, additional content related to or unrelated to the video game, etc. The suggestions and details related to the engagement metrics may be provided in a dash board format with a plurality of tabs. Each tab may provide either one or more suggestions or details of the engagement metrics. For example, a tab may provide a sequence of moves the player has to follow next, or a type of move to perform, or a map detailing the changes in the engagement level of the group based on the moves performed by the player, etc.

The game cloud system (GCS) 300 may include a network of back-end servers 301 that are distributed across different geolocations and are configured to execute instances of one or more video game applications and/or other interactive applications that are available at the back-end server 301. Each back-end server 301 may be a game cloud server or cloud application server that is configured to execute one or more instances of the one or more video games/interactive applications. For purpose of simplicity, reference will be made to a game cloud server (or simply a "game server" or "server") 301 executing an instance of a video game application, although the implementations disclosed herein can be extended to executing any other interactive applications. In addition to providing resources to execute the video game, the game server 301 may include a prediction engine 303 that is configured to analyze user profiles of a group of spectators that have accessed or are accessing the video game to watch game play of a player, generate an aggregate group profile for the group of spectators, analyze the aggregate group profile to determine engagement level of the group of spectators, and provide suggestions to improve the engagement level of the group of spectators. The suggestions may identify actions for the player to perform during game play, or may identify additional content for rendering either as overlay or alongside game scene of the video game. The actions may be to adjust game play of the video game. The additional content may be sponsored content, or additional details related to engagement metrics or game event or the player or other interesting content or any other content.

The game server 301 may be any type of server computing device available in the GCS 300, including, but not limited to, a stand-alone server, a server that is part of a server farm or data center, etc. Further, the game server 301 may manage one or more virtual machines supporting a game processor that executes an instance of a video game for the player, on a host.

The video game executed by the game server 301 may be a single player game or a multi-player game. In some implementations, the video game may be a massive multi-player online (MMO) game that allows a plurality of players from across different geolocations to access and play the video game. The game play of one of the players of the MMO game may be accessed by other users, such as spectators, or influencers. The influencers may share the video of the game play of the player, in real-time, and include commentaries related to the progression of the video game. The game server 301 may include a multi-player distributed game engine that is communicatively connected to game logic of the video game. Generally speaking, a game engine is a software layer that serves as a foundation for a game, such as MMO game, and provides a framework that is used to develop the video game. The game engine abstracts the details of doing common related tasks (i.e., game engine tasks) required for every game, while the video game developers provide the game logic that provides the details of how the video game is to be played. The game engine framework includes a plurality of reusable components for processing several functional portions (i.e., core features) for the video game that bring the video game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the video game.

During game play of a video game, a game engine 302 manages the game logic of the video game, collects and transmits one or more players inputs received from one or more client devices 100, to the game logic. The game engine 302 further manages the allocation and synchronization of the functional portions of the game engine 302 to process game data generated by the game logic, in an optimal manner, and generates frames of game data that is transmitted back to the client devices 100 for rendering. A variety of game engines 302 are currently available to provide different core functionalities and an appropriate game engine may be selected based on the functionalities specified for executing the video game. Interactions provided by spectators while game scene of the video game is being rendered at the respective client devices, and attributes of the spectators captured during the rendering of the game scene of the video game are also collected by a prediction engine 303 from the different sensors and input devices associated with the client devices 100 of the spectators and used to provide suggestions to the player to adjust their inputs to the video game or instructions to the game engine 302 to adjust content being rendered on the client devices 100 of the spectators. Some of the attributes of the spectators in the group that may be captured by the one or more sensors and/or input devices may include specific emotions expressed by the spectators while watching the game play of the player, a number of spectators that expressed similar emotions, comments provided by the spectators, number of spectators that provided each type of comment, interactions with different applications when the streaming data of the video game is being rendered, amount of time spent interacting with the different applications, attention of the spectators focused on or away from the display screen rendering the streaming data of the game play, or any combinations thereof.

The game server 301 receives a request from a player for playing a video game executing on the game server 301 and validates the request. As part of validation, the game logic retrieves the profile of the player from a user account datastore 401 and a list of game titles of video games that the user is authorized to access for game play from game titles datastore 403, and validates the identity of the player and determines if the player is authorized to play the video game. Upon successful validation, the game server 301 retrieves an instance of the video game and executes the instance. The instance of the game may be executed on a single game server (or simply referred to hereonwards as "server") 301 or on a plurality of servers, based on how the game logic is configured. A distributed game engine 302 on the server 301, in association with the game logic of the video game, manages the intricacies of game play of the video game based on the inputs provided by the player.

The game logic receives the inputs provided at the respective client device 100, by the player, during a game play session, analyzes the inputs, updates a game state of the video game based on the inputs, manages saved data of the player playing the video game, and generates game play data that is processed by the distributed game engine 302 prior to being streamed to the client devices 100 of the player and of the one or more spectators that have signed in to watch the game play session of the player. The player inputs to the video game are stored in user interactions datastore 407 as player interactions 407a. The saved data of the player and the game play data of the video game are also stored in game play datastore 404. The game inputs provided by the player during game play correspond to the activities performed by the player in the video game, and the inputs along with the activities are stored as part of telemetry data within the game play datastore 404. The telemetry data provides characteristics of each activity that a player attempted, the player accomplished, the player failed, etc., and player attributes of the player. The player attributes may be updated to the player profile stored in the spectator/player profile datastore 402. The spectator/player profile datastore 402 may be maintained separately or may be part of the user accounts datastore 401.

The game state of the video game identifies overall state of the video game at a particular point and is influenced by intricacies of the game play of the player. If the video game is a MMO game, then inputs from a plurality of players are used to influence the overall game state of the video game. The saved data of the player includes any game customization provided by the player for the video game.

In addition to the inputs from the player, the game logic may receive requests in the form of suggestions, from a spectator experience prediction engine (or simply referred to herein onwards as "prediction engine") 303 to adjust content or inputs to affect game play of the video game, based on interactions received from the spectators. The interactions from the spectators may be stored in the user interaction datastore 407 as spectator interactions 407b. Information included in the spectators interactions may be used to generate spectator engagement metrics for the group of spectators that have selected the game play of the player for watching. The prediction engine 303 aggregates the interactions provided by the spectators in the group, analyzes the interactions, and, may interact with the game logic to provide suggestions to adjust game play or include content for rendering with game scene, in order to improve the spectators engagement. The suggestions provided in the requests may be based on the preferences of the spectators or game state of the video game, and may identify type of actions, sequence of actions preferred by the spectators, next move to make during game play, or content to include within or outside the game scenes of the video game. These suggestions may be provided to the player to adjust game inputs during game play, and such adjustments to the game inputs cause adjustments to the game state. In some implementations, the suggested adjustments may request the player to follow a different path in the game, use specific type of tools, perform specific type of moves, etc. The prediction engine 303 may also provide suggestions to the game logic to adjust game content, based on analysis of interactions received from the spectators. The adjustment to game content may be in the form of injecting content (e.g., non-player characters or entities, etc.,) into the video game during game play or content for rendering alongside game scenes of the game play of the video game.

The prediction engine 303 may also receive interactions from influencers. Similar to the spectators, the influencers may provide interactions to improve engagement level of the spectators or improve game play of the video game. The prediction engine 303 may analyze the influencers' interactions and provide suggestions, such as specific moves or specific types of moves to make during game play, specific content to inject into the gaming environment or to include for rendering alongside a game scene of the video game during game play. The interactions of the influencers may be stored in the user interaction datastore 407 as influencer interactions 407c. Information from the influencers interactions may be used to generate influencer metrics.

The game play data of the video game stored in game play datastore 404 may be used to identify player metrics and game play metrics of the video game. The player metrics may be stored in player metrics datastore 405 and the game play metrics may be stored in game play metrics datastore 406. Alternatively, the player metrics datastore 405 and game play metrics datastore 406 may be part of the game play datastore 404.

Based on the suggestions or requests from the prediction engine 303 and based on the current game state of the video game, the game logic may identify and include content for rendering alongside or as overlay on the game scene of the video game, or inject content, non-player entities or non-player characters into the gaming environment of the player. The injection of the content or non-player characters or entities may be to provide additional challenges to the player, which can make the game play of the video game more interesting, which can cause an increase in the engagement level of the spectators. The player may follow the suggested moves or provide the suggested inputs during game play to affect the game state of the video game. Similarly, the game logic may include the suggested content, during game play, to improve the engagement level of the spectators.

In some alternate implementations, the prediction engine 303 may provide suggestions to the game logic to enable a player to inject a user into the gaming environment of the video game and allow the user to play alongside or against the player, or follow the player as the player navigates through various game scenes of the video game. In these implementations, the game logic may be configured to provide a user interface with a list of users for player selection and an injection option, which when selected by the player would cause the game logic to inject the selected user into the gaming environment during current game play. The selected user may be injected into a current game scene of the game play or in any other game scene following the current game scene. The list of users may include social contacts of the player, or users with whom the player has previously played the current video game or any other video game, or may be spectators that have or have not provided interactions, or may be an influencer. Allowing a user to follow the player within the gaming environment would provide an immersion experience for the user, which can enhance the interest of the user and, in the process, improve the engagement level of the user and hence the group of spectators watching the game play of the player. In this implementation, a ghost form of the user or an avatar or an icon or a game object of the user may be injected into the video game. In order for the injected user to participate in the game play of the video game, the user may have to be authorized to play the video game or at least have a limited access to the video game to enable the user to participate in the game play of the video game, wherein the limited access may be in terms of limited time or limited portion of the video game. The user participation may be enabled by providing a control interface with interactive controls through which the user may be able to provide interactions during game play.

Content provided for rendering alongside or as overlay may include promotional content (i.e., sponsored content) or additional content that is specific to the group of spectators, and may be customized in accordance to the aggregate group profile of the spectators.

The game logic processes the inputs from the player and generates game data that is then processed by the distributed game engine 302 prior to streaming the game data to the client device 100 of the player and the group of spectators, for rendering. The group of spectators may change dynamically over time due to one or more spectators leaving the group and/or one or more new spectators joining the group. The prediction engine 303 monitors the spectators in the group and when a change is detected in the group due to movement of spectators into or out of the group, the prediction engine updates the aggregate group profile to reflect the current composition of the spectators in the group. In accordance to the changes detected in the composition of the group, the suggestions provided by the prediction engine may also change to correspond with the changes to the spectators detected in the group.

Figure 2:
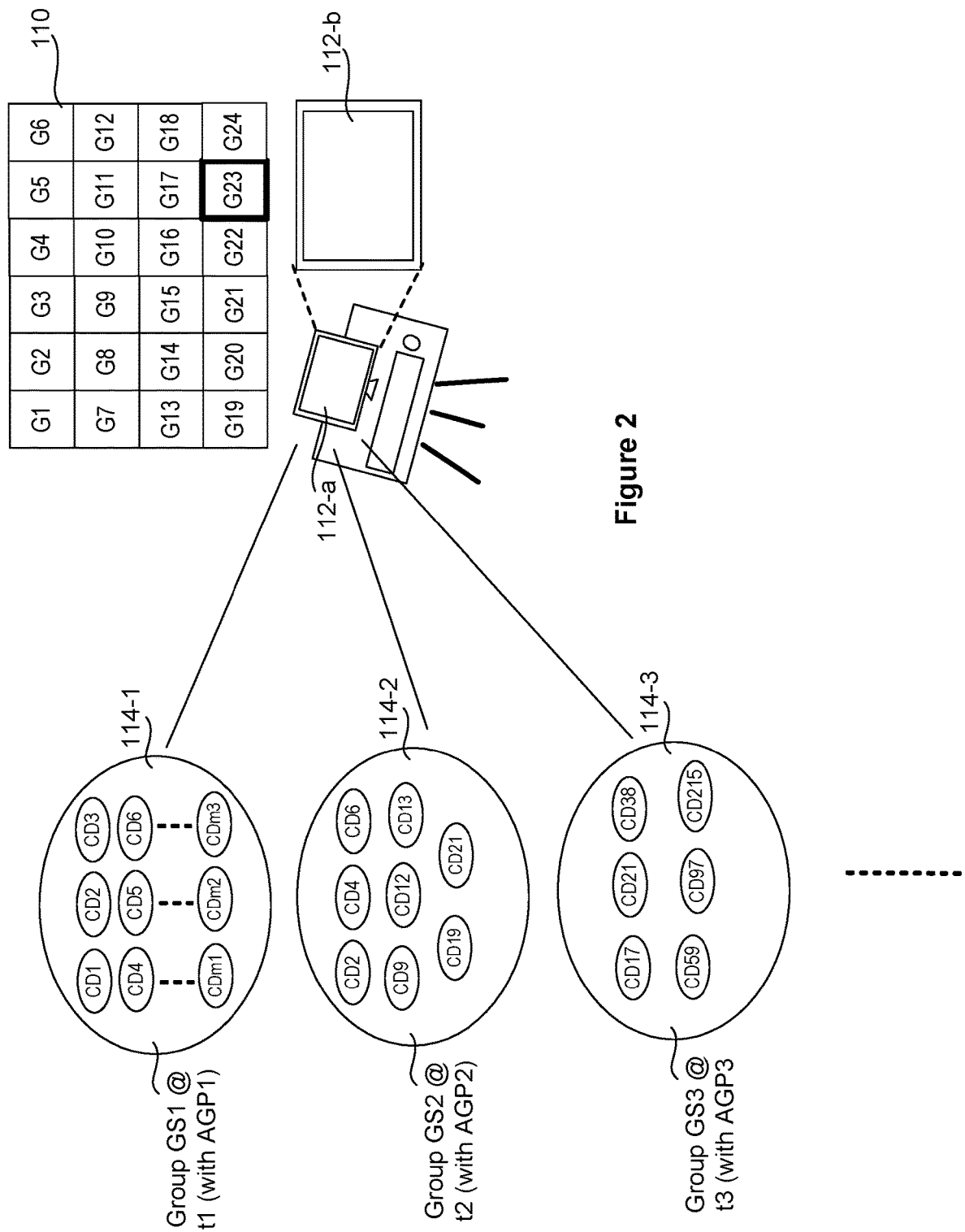
FIG. 2 illustrates a simplified view of a player playing a video game and the evolving nature of the group of spectators watching the player's game play of the video game, over time, in accordance with one implementation of the present disclosure.

FIG. 2 illustrates the dynamic changes that can occur in the group of spectators over time, in one implementation. A player has accessed a user account on a game cloud system 300 to select a game for game play. Upon authenticating the player using the user profile maintained at a game server 301, the game cloud system 300 provides a user interface 110 with a list of games that the player is authorized to access for game play. Player selection of game 23 for game play at the user interface 110 causes an instance of game 23 to be executed on the game server 301 of the game cloud system 300. The player provides inputs to affect game state of the game and game data representing a current game state of the game is streamed to a client device 100 of player for rendering on a display screen 112. In one implementation, the game data may be rendered on a monitor 112-a that is associated with the client device 100. In an alternate implementation, the game data may be projected on a display surface or on an external screen 112-b that is communicatively connected to the client device 100.

A group of spectators GS1 114-1 access the game cloud system 300 to view the game play of player at time t1. The group 114-1 of spectators may, at time t1, include spectators S1-Sm3. A prediction engine 303 available in the game server 301 identifies the spectators in the group 114-1 and extracts spectator profile of each spectator included in the group 114-1 from the user accounts datastore 401, or more specifically from spectator/player profile datastore 402 within the user accounts datastore 401. The prediction engine 303 then aggregates the spectator profiles of all the spectators in the group 114-1 to generate an aggregate group profile AGP1 for the group 114-1. The generated aggregate group profile AGP1 is associated with group of spectators 114-1. At time t2, the spectator group GS1 is shown to have changed (i.e., shrunk significantly from 114-1) with some spectators having left the group GS1 114-1. The group GS2 114-2 (spectator group at time t2) may be a subset of spectators from the group 114-1, or may include some spectators from group 114-1 and some new spectators that have joined the group. Consequently, the aggregate group profile AGP2 generated for group 114-2 may be similar to AGP1 (if spectators of GS2 are a sub-set of GS1) or may be different. At time t3, the spectator group GS3 114-3 may have evolved from spectator group 114-2. Spectator group GS3 114-3 may include a sub-set of spectators from spectator group 114-2 and/or some new spectators. The prediction engine 303 keeps track of the changes in the spectator group and updates the aggregate group profile to reflect the changes within the group. The changes in the aggregate group profile may result in changes to the suggestions provided to the player or game logic, as preferences of the spectators in the group may have changed. The changes to the preferences may be related to different types of action, different sequence of actions, different paths to follow during game play, different speed of game play, etc. For instance, the spectators in group 114-1 may prefer the player to perform certain types of actions, such as use specific type of tool to fight, perform more jumps, follow a specific path, etc., during game play, while spectators in group 114-3 may prefer the player to use a different type of tool, follow a different path, etc. As a result, the aggregate group profile generated for the different spectator groups identifies the changes in the spectators' preferences.

Figure 3:
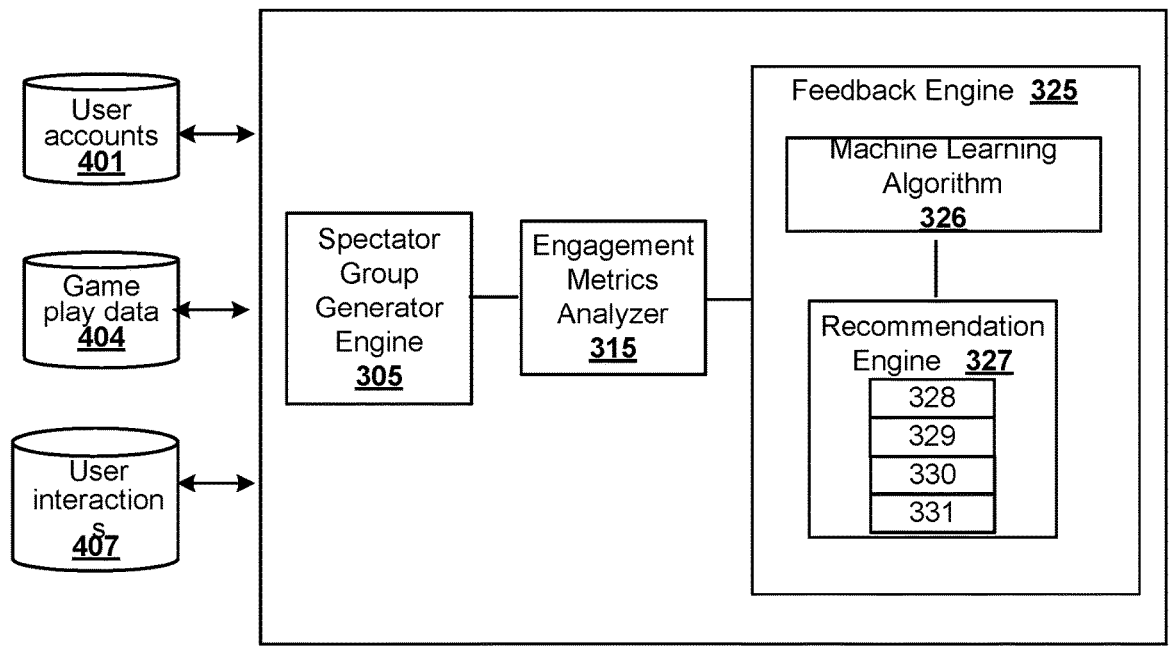
FIG. 3 illustrates a simplified block diagram of a prediction engine used in association with a game engine to generate aggregate group profile of a group of spectators watching game play of a video game of a user and for providing suggestions to improve engagement level of the group of spectators, in accordance with one implementation of the present disclosure.

FIG. 3 illustrates the different modules of the prediction engine 303 used to generate the aggregate group profile of the group of spectators and to provide suggestions to the player or signals to the game logic of the video game to adjust the game play or game content of the video game, or provide additional content to the group of spectators to keep the spectators interest in the video game, in one implementation. Some of the modules in the prediction engine 303 include a spectator group generator engine 305, an engagement metrics analyzer 315 and a feedback engine 325. The spectator group generator engine 305 is used to identify a group of spectators that have come together to watch game play of the video game by the player, and to generate an aggregate group profile (AGP) for the group. The spectator profile of each of the spectators in the group is retrieved from the spectator/player profile datastore 402 maintained within the user accounts datastore 401 to generate the aggregate group profile. The spectators that have come together may be co-located with the player or may be remotely located from the player and may be accessing the game play of the player by accessing the game play instance of the player executing at the game cloud system 300. Each of the spectators may be accessing the game play using their own client devices 100 and the game data is streamed to their client devices 100 for rendering. Details of generating the aggregate group profile using the spectator group generator engine 305 will be discussed with reference to FIG. 4.

The engagement metrics analyzer 315 is used to analyze interactions provided by the spectators at their respective client devices during game play of the game by the player and to determine engagement metrics of the group of spectators in relation to the game play of the player. The engagement metrics include details that are used to gauge the engagement level of the spectators in the group. Changes detected in the group of spectators result in corresponding changes in the engagement metrics. For example, a first set of spectators may prefer certain types of moves, certain sequence of moves, or a first path to follow, etc., during game play while a second set of spectators may prefer different types of moves, different sequence of moves, different paths to follow during game play. Details of analyzing the interactions of the spectators using the engagement metrics analyzer 315 will be discussed with reference to FIG. 5.

The feedback engine 325 is configured to take into consideration the engagement metrics of the group of spectators and provide suggestions to improve engagement level of the spectators in the group. As the group of spectators changes over time, the engagement metrics of the group change correspondingly. Changes in the group of spectators evolve gradually and not drastically. As a result, the suggestions provided by the feedback engine 325, based on current group of spectators, may be improvements from the suggestions provided for prior group of spectators. If, however, the change is drastic, then the spectator group generator engine 305 generates an aggregate group profile for the changed group, and the feedback engine 325 provides suggestions to the changed group based on the spectator composition of the changed group and these suggestions may be different from the suggestions provided to the prior group. To provide the suggestions, engagement metrics for the group are identified and extracted. The engagement metrics for the group are then provided as inputs to the classifiers (not shown) of the machine learning algorithm 326. The classifiers use the engagement metrics to generate an artificial model (AI) model (not shown). The AI model is trained, using the machine learning algorithm, by harvesting the changes in the engagement metrics of the group. For instance, the AI model is trained by progressively updating the nodes using interactions of the spectators and the game play of the player of the video game. The updates to the nodes may be in the form of weights assigned to the various engagement metrics and/or player inputs. The machine learning algorithm uses reinforced learning to strengthen (i.e., train) the AI model using the spectators interactions and player inputs collected during the game play session. The updates to the AI model are used to adjust the outputs to achieve the objective of improving the engagement metrics of the spectator group. The output are used by a recommendation engine 327 to generate suggestions to the player or to the game logic to either adjust the game play or provide additional content for the spectators. Details of the feedback engine 325 will be discussed with reference to FIG. 6.

Figure 4:
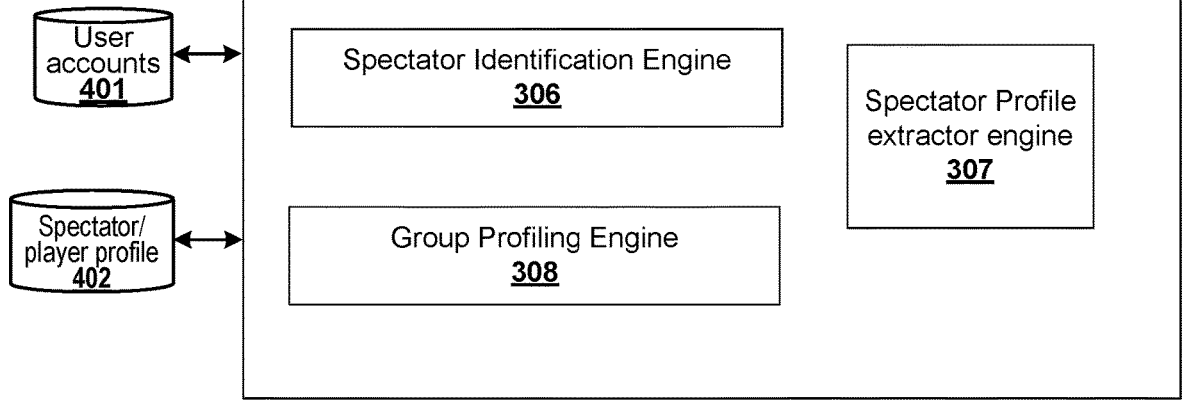
FIG. 4 illustrates a simplified block diagram of various components of a spectator group generator engine of the prediction engine used to generate an aggregate group profile of a group of spectators, in accordance with one implementation of the present disclosure.

FIG. 4 illustrates a simplified block diagram of the spectator group generator engine 305 included in the prediction engine 303, in one implementation. The spectator group generator engine 305 may include one or more sub-modules, such as a spectator identification engine 306, a spectator profile extractor engine 307, a group profiling engine 308, to name a few. Of course, there may be fewer or additional sub-modules and the spectator profile extractor engine 307 is not restricted to the aforementioned sub-modules. A spectator identification engine 306 within the spectator group generator engine 305 identifies spectators that have accessed game play of a player. The spectators may be co-located or remotely located from the player and are identified from the user account datastore 401. The spectators are identified using their user identifier and/or other biometric identifiers used to access the game cloud system 300. Each user of the game cloud system 300 is associated with corresponding profile data, which may be maintained in the user account datastore 401 or separately in a spectator/player profile datastore 402 that is part of the user account datastore 401. The spectator profile may include details, such as demographic information, age, biometric data, religion, height, weight, geo location, preferences for content (including game content and other content), etc.

A spectator profile extractor engine 307 is used to extract the profile information of each spectator accessing the game play of the player, from the spectator/player profile datastore 402. In addition to extracting the spectator profile information, the spectator profile extractor engine 307 may also collect spectators interactions 407b provided during game play of the player, from the user interactions datastore 407. The spectators interactions 407b may be captured by one or more image capturing devices, one or more input devices, and/or one or more sensors associated with the client devices 100 of the spectators. The spectators interactions 407b may be used to update the spectator engagement metrics 410.

A group profiling engine 308 is then used to aggregate the spectator profiles of the spectators in the group, to generate an aggregate group profile. In one implementation, depending on the profile of the spectators, the group profiling engine 308 may group the spectators into one or more spectator groups. For example, if the number of spectators that are watching the game play of the player is too big and the spectators are distributed across various geolocations or span different age groups, it may be beneficial to group the spectators in accordance to the geo locations or age groups, so that appropriate suggestions may be identified and provided to the player or the game logic to improve the engagement metrics of the respective groups. Alternatively, if the number of spectators that are watching the game play of the player is small, then it may be beneficial to generate a single group. Thus, depending on the number of spectators and the spectator profiles, the group profiling engine 308 may define one or more groups and generate an aggregate group profile for each group generated. The aggregate group profile includes profile information of the group and the interactions of the spectators captured during game play of the player. The aggregate group profile generated for the one or more groups of spectators are then forwarded as inputs to an engagement metrics analyzer 315 for processing.

Figure 5:
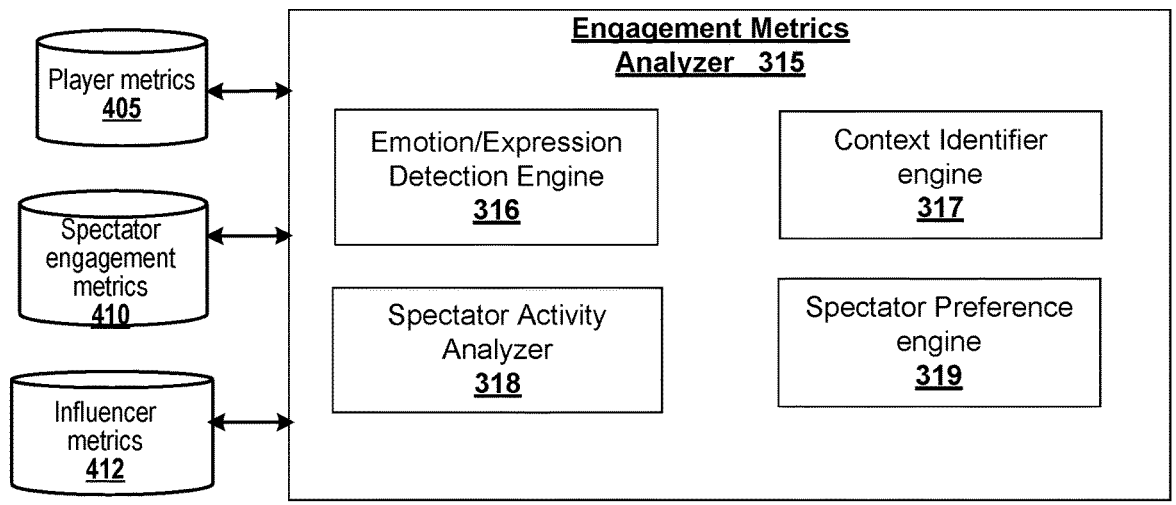
FIG. 5 illustrates a simplified block diagram identifying various components of an engagement metrics analyzer engine of the prediction engine used to determine engagement metrics of the group of spectators, in accordance with on implementation of the present disclosure.

FIG. 5 illustrates various modules of an engagement metrics analyzer 315 used to identify engagement metrics of the group of spectators, in one implementation. The engagement metrics analyzer 315 receives the aggregate group profile of the group(s) of spectators and analyzes the information contained within the aggregate group profile to identify the engagement metrics of the group of spectators. The spectators interactions captured at the respective client devices may include inputs provided by the spectators including interactions with other applications (e.g., social media applications, other interactive applications), interactions with other spectators and/or users (i.e., non-spectators) during game play of the video game. The interactions may be comments, messages, chats, emails, etc., exchanged between the spectators and between the spectators and the player, or actions performed by the spectators during game play of the player.

The interactions with other interactive applications may be indicative of the spectators' interest or distraction from the game play of the player. For instance, some of the interactions indicating the spectators interest in the game play of the video game of the player may include interactions promoting the video game, comments about the game play of the player to other users of social media applications, email applications, or message/chat applications, or comments related to specific moves or types of moves performed by the player, etc. Interactions indicative of the disinterest of the spectators may include interactions with other users via social media applications, email applications, chat/messaging applications, etc., to provide comments, messages, etc., not related to the video game or the game play of the player. In addition to the aforementioned interactions, the interactions indicative of the disinterest of the spectators may also include expressions (e.g., bored, not focused, etc.), movement of the spectators (e.g., spectator's face turning away from the display screen of the client device, spectator moving away from the display screen of the client device rendering the game play of the player, eyes of the spectator focused away from the display screen, etc.,) captured using the image capturing devices, sensors associated with client devices of the spectators, etc., during game play of the video game. The engagement metrics including the various interactions of the spectators can be used to determine the spectators interest in the game play of the player.

An emotion/expression detection engine 316 is configured to extract the expressions of the spectators during the game play of the video game of the player. The expressions of the spectators can be evaluated to determine if the spectators are showing interest in the game play of the player or are getting bored.

Similarly, a spectator activity analyzer 318 is configured to extract information related to the interactions of the spectators during game play of the player from the engagement metrics provided by the spectator group generator engine 305. As noted before, the interactions may include movement of the spectators captured by the various sensors and image capturing devices and/or inputs provided using input devices while the game play of the video game is being rendered at their respective client devices. If a spectator's face or eyes or body is detected to be moving away from the display screen associated with the client device of the spectator, then such movement may be used to indicate the user's distraction or disinterest in the game play of the player. The inputs may be related to game related or non-game related interactions exchanged between the spectators and between the spectators and the player.

A context identifier engine 317 of the engagement metrics analyzer 315 is configured to extract the context of the spectators' interactions generated while the game play is being rendered on the respective client devices. The context identifier engine 317 may be used to determine if the interactions are related or unrelated to the game play of the player.

A spectator preference engine 319 of the engagement metrics analyzer 315 is configured to extract the preferences of the spectators in the group. The preferences of the spectators may be obtained from the aggregate group profile and may be related to majority or all of the spectators in the group. The preferences may be related to the type of game, the type of game moves, the sequence of game moves, specific paths/direction to follow, type of tools to use, etc., preferred by the majority or all of the spectators in the group. The various modules of the engagement metrics analyzer 315 is configured to extract the various attributes of the spectators that are relevant to gauge the engagement level of the spectators in the group, from the engagement metrics. The engagement level attributes of the group of spectators are provided as inputs to the feedback engine 325.

Figure 6:
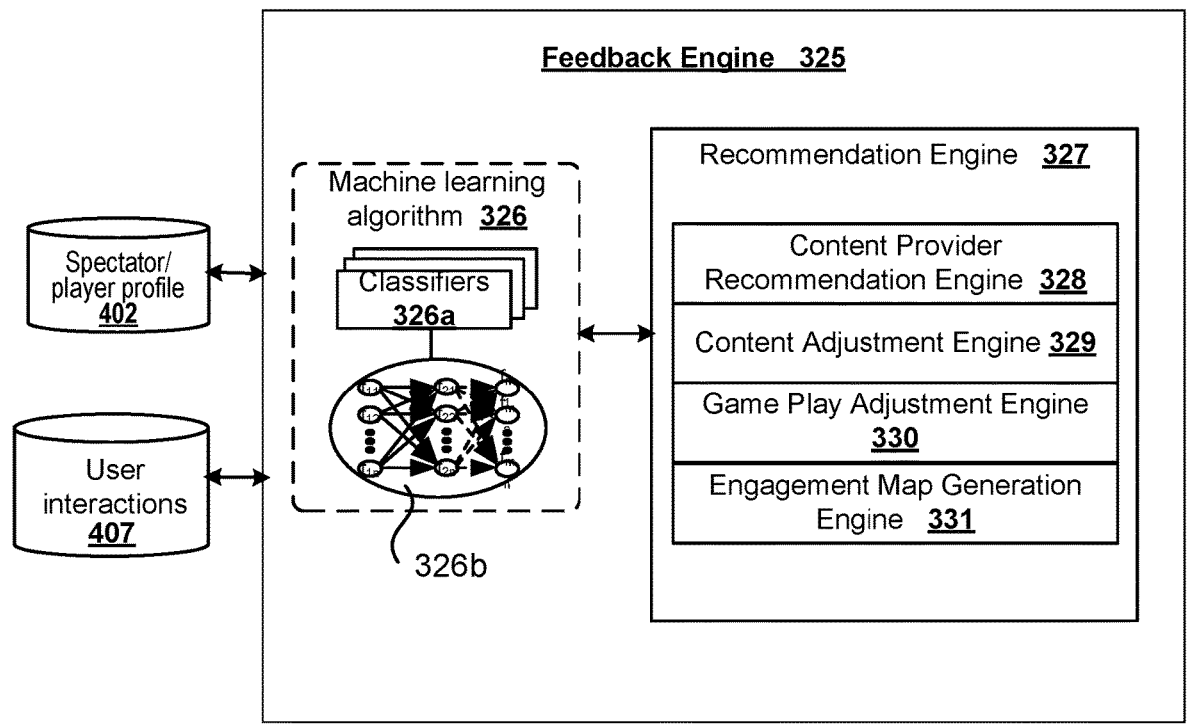
FIG. 6 illustrates a simplified block diagram of a feedback engine of the prediction engine that engages machine learning algorithm to provide feedback or suggestions to the player playing the video game or provide signal to a game engine executing an instance of the video game in order to improve engagement level of the group of spectators, in accordance with one implementation of the present disclosure.

FIG. 6 illustrates an example feedback engine 325 that is used to provide recommendations to the game logic or to the player of the video game, in one implementation. The feedback engine 325 includes a machine learning algorithm 326 with a plurality of classifiers 326a that are used to generate a machine learning model (i.e., artificial intelligence (AI) model) 326b with the engagement level attributes of the group of spectators and the game play data generated in response to the inputs from the player. Each classifier 326a is predefined to identify and classify specific attributes of the group of spectators to achieve one or more objectives defined for improving the engagement metrics of the spectators. The AI model 326b includes a plurality of nodes and edges defined between consecutive pair of nodes. The engagement metrics provided by the engagement metrics analyzer 315 and the game play data resulting from the player's inputs are used for defining the nodes of the AI model 326b. Edges between any two consecutive nodes define the relationship between the engagement metrics/game play data defined in the respective nodes. The classifiers are used to tune the AI model 326b based on the ongoing players inputs and the engagement metrics resulting from the players inputs to determine how to improve the game play of the video game to influence the engagement metrics, and the correlation is provided in the output from the AI model 326b. The output of the AI model 326b is forwarded to a recommendation engine 327.

The prediction engine 303 used to generate and train the AI model may be provided in software, hardware, firmware, or any combination thereof. The prediction engine 303 is configured to use the player inputs and the spectators' engagement metrics during the game play session of the player and provide suggestions for improving the engagement metrics of the group of spectators. The AI model generated by the prediction engine assists in identifying appropriate suggestions to either the player or the game logic for improving the engagement level of the spectators.

A recommendation engine 327 within the feedback engine 325 is configured to examine the output of the AI model, identify the suggestions that need to be made, the targeted recipients of the suggestions, and provide recommendations to the targeted recipients in order to improve engagement metrics of the spectators watching the game play of the video game of the player. For example, the recommendations may be directed toward including promotional content or statistical content or graphical map content, or injecting additional characters or entities in certain game scene of the video game, based on game state of the video game. The targeted recipient may be a user or non-user entity. For example, the non-user entity may be the game server or the game logic or the content provider. The user may be the player or the influencer. Appropriate signals may be provided to the game server to generate or retrieve the content for inclusion with the game play data streamed to the client devices of the spectators, players, or to inject characters into the gaming environment, during game play of the player. Alternatively, appropriate instructions may be provided to the player to perform certain actions, certain sequence of actions, certain types of actions, etc., during game play.

The recommendation engine 327 includes a plurality of sub-modules for identifying and forwarding recommendations to appropriate recipients, so that game play or content rendered at the client device of the spectators, players may be adjusted. Some of the sub-modules within the recommendation engine 327 include a content provider recommendation engine 328, a content adjustment engine 329, game play adjustment engine 330 and engagement map generation engine 331. The various sub-modules will be described in detail with reference to FIGS. 7-9.

Figure 7:
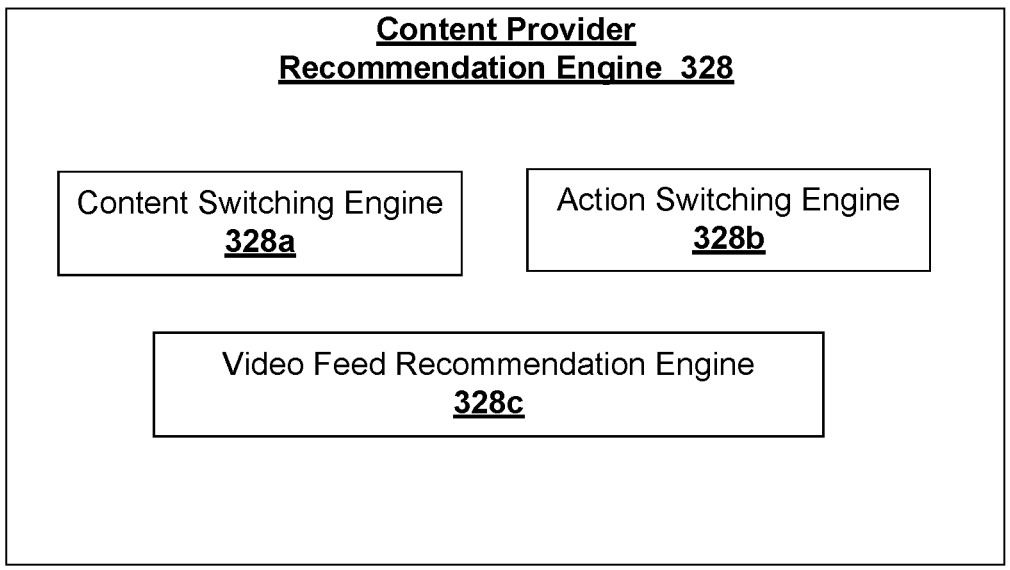
FIG. 7 illustrates a simplified block diagram of a content provider recommendation engine of the feedback engine used for providing recommendation to a content provider (e.g., a player or an influencer) in order to improve engagement level of the group of spectators, in accordance with one implementation of the present disclosure.

FIG. 7 illustrates the details of the content provider recommendation engine 328 of the feedback engine 325 used to provide recommendations to the player and/or an influencer. For example, the content provider recommendation engine 328 provides instructions to the player to adjust content or interactions during the game play. The content provider recommendation engine 328 may also provide instructions to an influencer to select video stream corresponding to game play of the player for streaming to client devices of spectators. As mentioned previously, an influencer may be a user who has a group of spectators following what the influencer is watching. The group of spectators may be provided a video of game play of the player shared by the influencer with comments related to the game play of the player provided by the influencer. The number of spectators following the video shared by the influencer may be based on the popularity and/or expertise level of the influencer, and/or availability of the video feed of the game play of the player. For example, the only video feed of the game play of the player may be the one provided by the influencer. In an alternate example, the video feed of the game play shared by the influencer may include expert comments on the strategy adapted by the player, a unique sequence of actions performed by the player, etc., or funny or in-depth comments related to the game play or the player, provided by the influencer.

A content switching engine 328a of the content provider recommendation engine 328 is configured to provide instructions to the player to switch content, in order to improve the engagement metrics of the spectators in the group. The instructions to switch may be provided as suggestion by the feedback engine 325 based on the output of the AI model 326b. The instructions to switch content may be suggested to the player, based on the engagement level of the spectators observed by the engagement metrics analyzer 315. For instance, during game play of the video game, the progression in the game may be slow or not exciting, or there may not be sufficient activities or challenges occurring in the game to make the game play exciting for the spectators. As a result, the spectators may begin to exhibit boredom or may switch their attention to other interactive applications. In order to improve the engagement level of the spectators and to keep them engaged in the game play of the player, the content switching engine 328a may suggest to the player to switch to a different content, such as a different game. The different game may be suggested based on the preferences of the spectators, player's accessibility to the different game, expertise level of the player for the different game, game genre of the different game, contextual similarity of the different game to the video game the player is to switch from, and/or other criteria. The switching to suggested different game may result in the player continuing to keep the attention of the group of spectators (i.e., improving the engagement metrics of the group of spectators).

An action switching engine 328b of the content provider recommendation engine 328 may identify a recommendation that is directed toward a player. The action switching engine 328b is configured to use the output from the AI model to provide recommendations to switch the interactions provided by the player during game play. The recommendation to switch may identify the specific actions or specific type of actions or specific sequence of actions for the player to switch to from the current type of interactions the player is performing. The output from the AI model is used to identify the specific recommendation based on the AI model training using the interactions provided by the player during game play, the activities attempted/accomplished from the interactions, engagement level of the spectators responsive to the interactions, preferences of the spectators, etc. For example, the player may use a certain type of tool to accomplish certain task or overcome a challenge or certain action against an enemy, and the spectators may desire the player to use a different type of tool to perform the task.

A video feed recommendation engine 328c of the content provider recommendation engine 328 may identify a recommendation that is directed toward an influencer. The video feed recommendation engine 328c is configured to use the output to identify video feeds that can be recommended to the influencer. In one implementation, the group of spectators may be following the video feed of the game play of the player shared by the influencer instead of the spectators following the game play of the player. In such implementations, responsive to detecting a low engagement level of the spectators and based on the output of the AI model, the video feed recommendation engine 328c may recommend one or more video feeds for the influencer to share in order to improve the engagement level of the spectators. These video feeds may be identified based on the spectators preferences, influencer's preference, popularity of the video feed, etc. The video feeds may be identified from different game play sessions of the video game of the player or from game play sessions of the video game played by other players. The influencer may share the recommended video feeds with the group of spectators to keep the group of spectators engaged in the content shared by the influencer, so as to improve the engagement level of the spectators.

Figure 8:
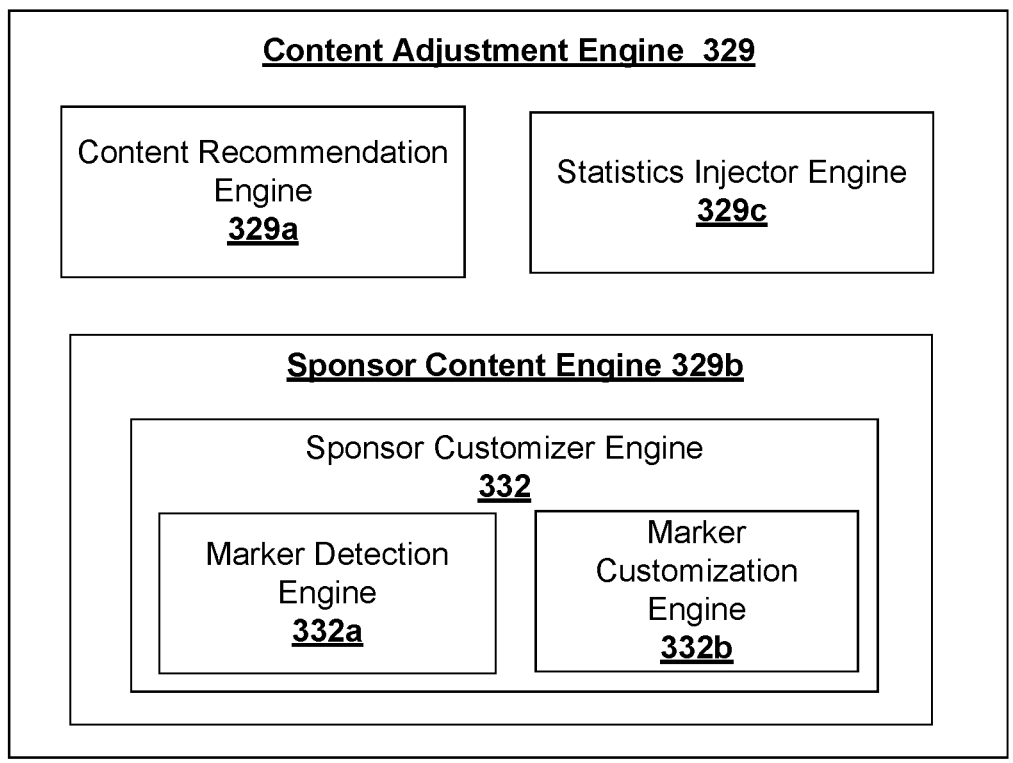
FIG. 8 illustrates a simplified block diagram of a content adjustment engine within the feedback engine used for providing identifying content for rendering alongside game scenes of a video game, to keep the group of spectators engaged in the video game of the player, in accordance with one implementation of the present disclosure.

FIG. 8 illustrates an example content adjustment engine 329 of the recommendation engine 327 used for recommending different content to be included with the game play data streamed to the group of spectators, in order to improve the engagement level of the spectators. A content recommendation engine 329a may be used to identify content that may be included for rendering alongside or as overlay over the game play data. The content may be additional content related to the video game, such as statistics of the player or statistics of other players currently playing or that have previously played the video game, or details of certain features of the game scene, or details related to difficulty level of the game, or details related to popularity of the video game, or details of the game scene being rendered. Alternatively, the content may be related to other video games that are in the same genre as the video game that is currently being played by the player or video games that are popular with other players that are within similar demographics of the player. The content recommendation engine 329a may also be used to identify and provide promotional content for rendering alongside the game scene of the video game. The promotional content may be obtained from a content provider, such as an advertiser, content generator, etc.

The content adjustment engine 329 may also be used to inject some content into the gaming environment, in one implementation. A sponsor content engine 329b of the content adjustment engine 329 may be used to identify and inject additional content, such as promotional content, into the gaming environment of the video game, during game play by the player. The promotional content may be identified based on the content included in the gaming environment, or based on attributes of the spectators, for example. The attributes of the spectators may be categorized in accordance to the demographics, age, geo location, preferences of the spectators at different times of day, activities of the spectators prior to following the video game, etc., and the group of spectators may be clustered in accordance to these categories. The recommendations of the promotional content to the group of spectators may be customized based on such clustering and the recommended promotional content included within the game scene of the video game, for example.

It is to be noted that the attributes of the spectators may dynamically change due to dynamic nature of the group or due to preferences of the spectators at different times of day. The attributes related clustering, therefore, will take into account the dynamic nature of the attributes of the spectators so that appropriate content can be recommended to different cluster of spectators within the group. The recommendations of the sponsored content may be customized based on the attributes of the spectators, such as geolocations of the spectators, presence or absence of other users in the vicinity of the spectators, time of day, sponsored content preferences of the spectators, interactions of the spectators with other interactive applications or games, etc. A sponsor customizer engine 332 may be used to identify the various attributes of the spectators within the group, the clustering of the spectators in the group, the preferences of the spectators toward the sponsored content, etc., and customize the sponsored content for each cluster identified within the group of spectators following the game play of the player.

In some implementations, the sponsor customizer engine 332 may be used to promote an influencer sharing the game play of the player that the influencer is watching and commenting on. The video feed generated and shared by the influencer, in one implementation, may include a video of the influencer watching and commenting on the game play of the player. In such implementations, the influencer may wear wearable marker elements that can be used to customize the sponsored content. The marker elements worn by the influencer may be detected and be replaced with sponsored content. The sponsored content can dynamically change based on the changes in the content of the game play or may be temporal based, for example. The sponsored content may be used as a monetizing or promotional vehicle to compensate/promote the influencer, and the monetary compensation or promotion may depend on the popularity of the influencer, popularity of the player, or popularity of the video game played by the player.

A marker detection engine 332a may be used to identify the marker elements worn by the influencer from images of the influencer captured in the video feed of the influencer captured by the one or more sensors or image capturing devices and shared with the group of spectators. The identified marker elements are replaced with the sponsored content selected for the spectator group. In some implementations, the sponsored content may be customized based on the clustering of the spectators within the group. A marker customization engine 332b may be used to identify the sponsored content that correlate with the attributes of the spectators associated with each cluster in the group. For example, for a cluster of spectators that are from a specific geolocation, the sponsored content may be geolocation based content (e.g., Japanese content for spectators accessing the video feed shared by the influencer, from Japan). In an alternate example, the sponsored content may be identified based on age group of each cluster of spectators. The customized sponsored content is then included with the game play data for rendering at the client devices of the spectators of the respective cluster. The sponsored content (i.e., promotional data) may be included with game play data streamed to the spectators and not to the player or influencer, so as to not distract the player during game play or the influencer commenting on the game play that the influencer is substantially live-streaming to the spectators. In alternate implementations, the sponsored content may be included with game play data for rendering on the client devices of the player or influencer.

In some implementations, the content that may be included for rendering may be statistical data related to game play of the player or of other players. A statistics injector engine 329c may be used to identify one or more features of the video game or the game play of the video game or attribute of the player of the video game, and provide statistical data associated with the identified features. For example, the features may relate to a game level or difficulty of game level or expertise of the player, and the statistical data may be related to number of times a particular activity/challenge at the game level was attempted, accomplished, time taken to complete the activity/challenge at the level, etc. The statistics injector engine 329c may interact with game play datastore 404 to retrieve the intricacies of game play of the video game of the player and/or other players and use the game play intricacies of the player, other players to dynamically generate the statistical data. The statistics injector engine 329c may then communicate with the game server 301 or the game logic to dynamically adjust the game play data to include the generated statistical data during appropriate times of game play so as to render alongside or as overlay on the game scene of the video game or to inject within the gaming environment.

Figure 9:
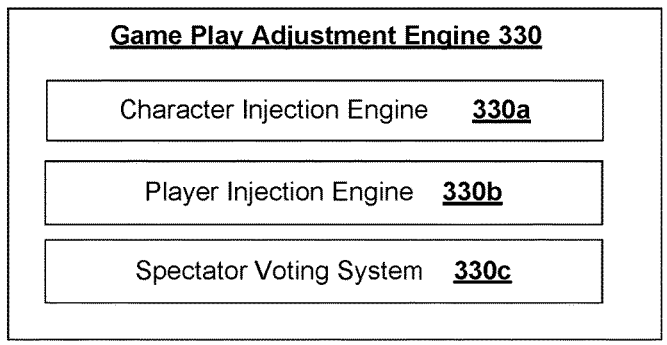
FIG. 9 illustrates a simplified block diagram of a game play adjustment engine within the feedback engine used for adjusting game play of the video game in order to improve engagement level of the group of spectators, in accordance with one implementation of the present disclosure.

FIG. 9 illustrates an example game play adjustment engine 330 that may be used to provide content within the gaming environment of the player based on the output from the AI model 326b, in one implementation. The feedback engine 325 may recommend content for including within the gaming environment of the player so as to improve engagement metrics of the group of spectators watching the game play of the player. In one implementation, the content that may be injected into the gaming environment may include non-player characters/entities, or avatar of users, who may be spectators or other players/users. The game play adjustment engine 330 of the feedback engine 325 is configured to interact with the game logic of the video game to determine the game state of the game play of the player, and identify characters or entities to inject within the gaming environment during game play of the player. A character injection engine 330a of the game play adjustment engine 330 is configured to identify the appropriate non-playing characters or entities to inject into the gaming environment. The non-playing characters or entities may be chosen so that the characters or entities are contextually relevant to the game scene into which they are to be injected. The non-playing characteristics may be injected to provide sufficient challenges to the player to make the game play interesting to the spectators. For instance, the character injection engine 330a may use the output of the AI model to determine that the game play of the player is progressing at a slower pace and does not include sufficient challenges for the player to make the game play more interesting, leading to decrease in the engagement level of the spectator group. In order to infuse sufficient excitement in the game play to the player and to the spectators watching the game play of the player, the character injection engine 330a in association with the game logic may identify and inject non-playing characters or entities into the gaming environment. The characters/entities may be static or may be moving. When moving characters are being injected into the game play, a size or a shape or speed of the moving characters may be chosen to provide sufficient challenges to the player at the level at which the player is currently playing.

In addition to injecting non-player entities/characters, the game play adjustment engine 330 may also inject one or more other users into the gaming environment. A player injection engine 330b of the game play adjustment engine 330 may be used to inject the one or more other users. The other users may be selected from social contact of the player or may be another player that has already played the video game or another player with whom the player has played another multi-player game, or may be a spectator that is watching the game play of the player, or an influencer that may be streaming the game play of the player. An avatar, an icon, or a ghost form of the other user may be injected into the gaming environment of the player so as to allow the other user to participate in the game play of the player (i.e., play with or against the player) or to follow the player within the gaming environment. In order to allow the other user to participate in the game play (either play with or against, or follow) of the player, the player injection engine 330b, in association with the game logic of the video game, may be configured to send a request to the selected other user to join in the game play of the player. The request may include a link for the other user to access the game play session of the player and may also include an interface with controls to enable the other user to participate in the game play of the player. The player's and the other user's interactions in the video game may be used to affect the game state of the video game. Injecting the other user into the gaming environment and enabling the other user to participate in the game play of the video game of the player enhances the interest of the other user as well as the interest of the group of spectators watching the user's participation in the game play of the player.

In addition to character and player injection into the gaming environment, the game play adjustment engine 330 may also provide option for the spectators in the group to participate in some ways with the game play of the player, in some implementation. A spectator voting system 330c of the game play adjustment engine 330 may be used to provide spectators with an ability to vote on some events or activities or challenges within the game play of the player. For instance, based on the output of the AI model, the spectator voting system 330c may be configured to identify an event, or a task, or an activity or a challenge or any other random element within the current game play of the player and provide an interactive voting interface to enable the spectators to respond to a query or to vote on one or more options related to the identified event, task, activity, challenge or the random element. For example, the query or voting option may include what may happen next in the game play of the player—i.e., will the player successfully complete the task or activity or challenge that the player is attempting, number of attempts it would take the player to complete the task or activity or challenge, or what event or challenge or activity will occur next, or which path the player will attempt next, etc. The spectator voting system 330c may also provide incentives to the spectators to participate in the voting. Additionally or Alternatively, the spectators may be provided with additional incentives for correctly responding to the query included in the voting interface.

In some implementations, the reputation of a spectator may be taken into consideration when providing incentives. In alternate implementation, the spectator may themself provide incentives to improve weight of their vote. For example, one of the options that may be provided by the spectator voting system 330c may be a vote to influence the activities of the player that the spectator would like to see in the game play. In this example, the option may allow the spectator to provide incentives to the player so that the spectator's vote may be considered favorably for influencing the activities of the player. Additionally or Alternatively, the behavior and/or the reputation of the spectator may be considered along with the incentives provided by the spectator when the vote of the spectator is evaluated by the spectator voting system 330c. The behavior and/or the reputation of the spectator and the incentives provided by the spectator may be weighted differently when evaluating the vote of the spectator for influencing the player to perform certain activities during game play. For example, a first spectator who has exhibited good behavior and provided lower incentive to the player may be weighted higher than a second spectator who has exhibited bad behavior and provided higher incentive than the first spectator. The spectator is shown to exhibit good behavior, for example, when the spectator posts encouraging or positive comments, writes good reviews of the player, entertains other spectators' comments in a positive manner, etc. Similarly, a spectator is shown to exhibit bad behavior, for example, when the spectator posts mean or derogatory remarks/comments, constantly provides bad reviews or critics the player, exhibits bullying characteristics like harassing other spectators with mean posts, etc. In the above example, the good behavior of the first spectator is weighted higher than the incentives provided by the spectator. As can be seen, the spectator voting system 330c takes into consideration the attributes of the spectator as well as the incentives provided by the spectator when evaluating the votes of the spectator. The incentives may be financial incentives, game related incentives (e.g., improving a spectator's ranking/reputation, incrementing points that may be used for ranking the spectator, etc.). The results of the evaluation of the votes collected from a plurality of spectators may be provided at some future time and may depend on how long the voting option is made available or how many spectators votes is collected. The voting interface and the results of the voting may be provided alongside the game play of the player that is being streamed to the spectators' client devices for rendering. The voting interface and the incentives provided by or to the spectators via the spectator voting system 330c provides ways to ensure that the spectators linger longer to watch the game play of the player in order to determine how their vote was evaluated.

In one implementation, in addition to the content being rendered alongside game play or injected into the gaming environment of the video game to keep the spectators engaged, the prediction engine 303 may be configured to provide information related to one or more engagement metrics, player metrics to keep the player informed of the status of the player, engagement level of the group of spectators, and/or suggestions for performing certain actions during game play of the player. The suggestions or recommendations may be in the form of instructions to the player to adjust interactions within the game play, or to adjust game content during game play. The suggestions to the player may be provided by the content provider recommendation engine 328, or content adjustment engine 329, and/or the game logic of the video game and can be rendered as pull-down or pop-up tabs in a dashboard menu (or simply referred to hereonward as "dashboard"), during game play of the video game of the player. The one or more engagement metrics may be identified from the output of the AI model.

In one implementation, the one or more engagement metrics of the group may be provided as an interactive map (i.e., graphical representation) generated by an engagement map generation engine 331. The engagement map generation engine 331 may engage an analytics or a graphic application to plot the engagement level of the spectators observed over time the spectators are signed in to watch the game play of the player. The engagement map provides a visual representation of the engagement level of the spectators that can be quickly absorbed by the player while the player is engaged in the game play. The dashboard is an interactive dashboard and include one or more pop-up/pull down tabs with each tab providing the various game play metrics, engagement metrics, etc. The pop-up/pull down tabs ensure that relevant data is available to the player to access without unnecessarily cluttering the display screen of the client device of the player on which the game play data is being rendered. The different tabs in the dashboard provide useful information that can be used by the player to improve engagement metrics of the spectators.

Figure 10:
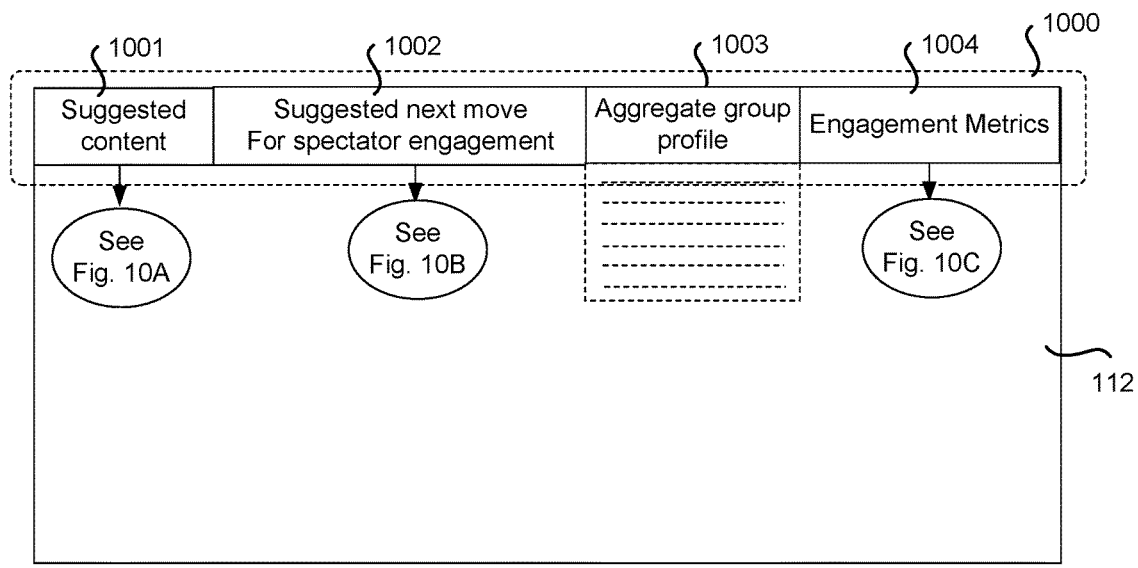
FIG. 10 illustrates a simplified view of an interactive dashboard rendered alongside a game scene on a client device of a player used to provide interactions during game play of the video game, in accordance with one implementation of the present disclosure.

FIG. 10 illustrates an example pop-up dashboard 1000 that may be provided to keep the player informed on various metrics, in one implementation. The dashboard 1000 is an interactive dashboard and includes a plurality of tabs, 1001-1004, for example, with each tab providing details related to adjusting content, adjusting interactions, aggregate group profile of the spectator group, and visual representation of the engagement metrics of the spectator group, etc. The number of tabs and details of each tab of the dashboard 1000 is provided as an example and should not be considered restrictive. Fewer or additional tabs may be provided in the dashboard 1000 depending on the amount of information that is to be provided to the player.

In one implementation, the interactive dashboard may be integrated with a game application programming interface (API) defined for the video game. The game API is configured to control access to and/or use of different interactive interfaces, including input devices, and manage device bandwidth, other device loadouts, etc. The game API may also be configured to manage access to the tabs or links, especially links that directs a user (i.e., player, spectator, etc.,) to a website for accessing details related to the player, spectator, or game moves. The website may be hosted within the game cloud server that is executing the video game or is hosted on another server and is accessible to the video game. In one implementation, the interactive dashboard 1000 may be provided as an on-screen overlay. The on-screen overlay may be presented in a portion of the display screen of the client devices of the player and/or the spectators of the group of spectators. The display screen of the client devices may be divided into a plurality of zones and a specific portion of the display screen may be identified for overlaying the interactive dashboard 1000. The specific portion for overlaying the interactive dashboard 1000 may be identified by game logic of the video game based on activities occurring in the video game. The activities occurring in the video game are dynamic in nature based on the game inputs provided by the player during game play. As a result, the portion of the screen where the activities of the game play are rendering may dynamically change. The specific portion of the display screen where the interactive dashboard 1000 is presented may be determined by game logic of the video game so as to ensure that the overlay does not interrupt the game play of the player or obstruct viewing the game play of the video game of the player. In some implementations, the specific portion of the display screen of the client devices for rendering the interactive dashboard 1000 may be determined based on rendering preferences specified by the player/spectators. The rendering preferences may be in addition to or in place of the specifics provided by the game logic.

Figure 10A:
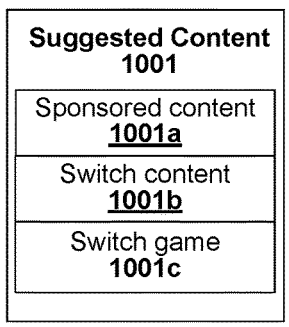
FIGS. 10A-10C illustrate expanded view of some of the interactive tabs included in the dashboard of FIG. 10, in accordance with one implementation of the present disclosure.

The suggested content tab 1001 may identify content that was recommended by the content provider recommendation engine 328 or content adjustment engine 329 for the player to choose to include with the game play of the video game. FIG. 10A illustrates some of the options 1001a-1001c that the player can select to include with the game play, in one implementation. The sponsored content option 1001a allows the player to select one or more of a plurality of sponsored content for rendering alongside the game play of the game for the spectators. The sponsored contents that are provided as options in the sponsored content option 1001a may be based on the content of the video game, the popularity of the player, the popularity of the video game, relevancy of the sponsored content, etc. The switch content option 1001b allows the player to switch content selected for rendering with the game play. The switch content option 1001b may identify additional content, such as game statistics of the video game including player statistics of the player or of different players, interesting tips or information related to the different levels, challenges, activities, etc., interesting information related to the player, etc., different content that is recommended for the player based on the player's attributes and/or preferences, and the player is provided with option to switch from the existing content provided with the game play to the recommended content. The switch game option 1001c allows the player to switch interactions from the video game to a different video game or interactive application. The video game and/or interactive application included in the switch game option 1001c are identified by matching the preferences of the player and accessibility of the games/application to the player for interacting.

Figure 10B:
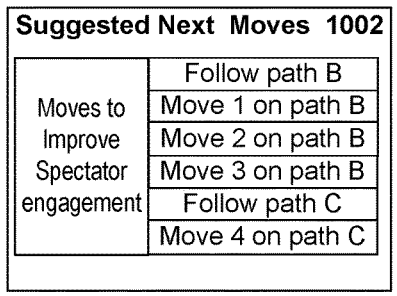

The suggested next move tab 1002 may identify a specific move or a specific sequence of moves that the player can select to perform. The specific move or specific sequence of moves or specific path to follow is provided by the action switching engine 328b. For instance, when the spectators prefer the player to perform specific types of moves or specific sequence of moves, the player is provided with suggestions identifying the preferred moves of the spectators. FIG. 10B illustrates an example of the suggested moves provided by the suggested next move tab 1002 for the player to perform. The suggested next move tab 1002 may include a type of move or sequence of moves. FIG. 10B illustrates the suggested sequence of moves for the player to follow, which includes following specific path(s) (i.e., path B followed by path C), specific sequence of moves to follow on the specific paths (e.g., moves 1-3 on path B and move 4 on path C). Based on the suggested next move, the player may select to switch their interaction to the suggested moves or sequence of moves.

The aggregate group profile tab 1003 may identify one or more attributes of the group of spectators identified from the aggregate group profile. The attributes may include demographics, age, geolocation, content preference, interaction preference, etc. The player can select the aggregate group profile tab 1003 to determine the attributes of the spectator group. Based on the attributes, the player may elect to adjust their content or interactions to enhance the engagement metrics of the spectators.

Figure 10C:
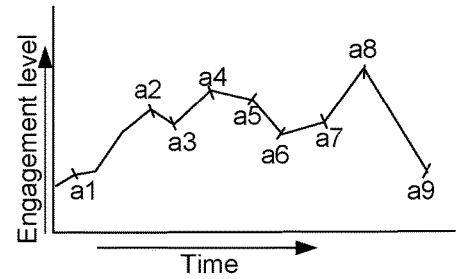

The engagement metrics tab 1004 may provide a visual graphical view of the engagement metrics of the spectator group following the game play of the player. A sample engagement metrics graph 1004*a* generated with the engagement metrics of the spectator group is shown in FIG. 10C. The graph identifies the engagement level of the spectators over time as the spectators are engaged in watching the game play of the player. The engagement level of the spectators varies over time, as represented by reference points a1-a9, based on the type of moves or sequence of moves followed by the player. For example, when the player performs a first move, the engagement level of the players may be at 'a1'. When the player continues to perform moves that the spectators enjoy watching, the engagement level of the spectators begins to increase, as represented by reference point 'a2'. When the player begins to make mistakes or is unable to complete a task due to select of wrong type or sequence of moves, the spectator engagement level begins to fall, as represented by reference point 'a3'. When the player begins to recover by performing certain type of moves, the engagement level of the player begins to climb up, as represented by reference point 'a4'. After reaching the engagement level represented by reference point 'a4', the player begins to perform moves that are not preferred by the spectators. These moves may also cause the player to not make much progress in the game. As the player fails to progress, the game play becomes less interesting for the spectators, resulting the engagement level of the spectator group to fall, as represented by reference points 'a5' and 'a6'. At this stage, the player may select the suggested next move tab 1002 to see if there is a set of suggested moves to help the player to progress in the game. These moves may be the ones suggested by the action switching engine 328*b*. The moves suggested by the suggested next move tab 1002 may be moves that were suggested by an expert player who may be spectating the game play of the player or may be provided by a game logic based on the current game state and the experience/capability of the player. As the player performs the suggested moves, the game play of the player as well as the engagement level of the spectators begins to improve, as shown by reference point 'a7' and 'a8'. When the player continues to play, the engagement level may start to drop significantly, as shown by reference point 'a9', based on the inputs from the player. Consequently, the output of the AI model 326*b* may suggest next moves provided by the suggested next move tab 1002 that corresponds to switch out of the game or to suggest providing additional content to keep the spectators engaged or suggested other moves to improve progression in the game play and hence the engagement level of the spectators.

The various embodiments described herein provide ways to detect the engagement metrics of the spectators that have selected the engagement play of the video game of the player to follow, and provide suggestions to assist the player to improve engagement metrics of the spectators. Improving the spectators engagement may result in improved interest in the video game, which can translate to improved revenue for the game developer or game distributor, or content sponsor. It may also assist the player to improve their monetary revenue, if the game provides such benefits, or improve their status or popularity or expertise level within the gaming world. Other benefits may become apparent to one skilled in the art after reviewing the various embodiments.

Figure 11:
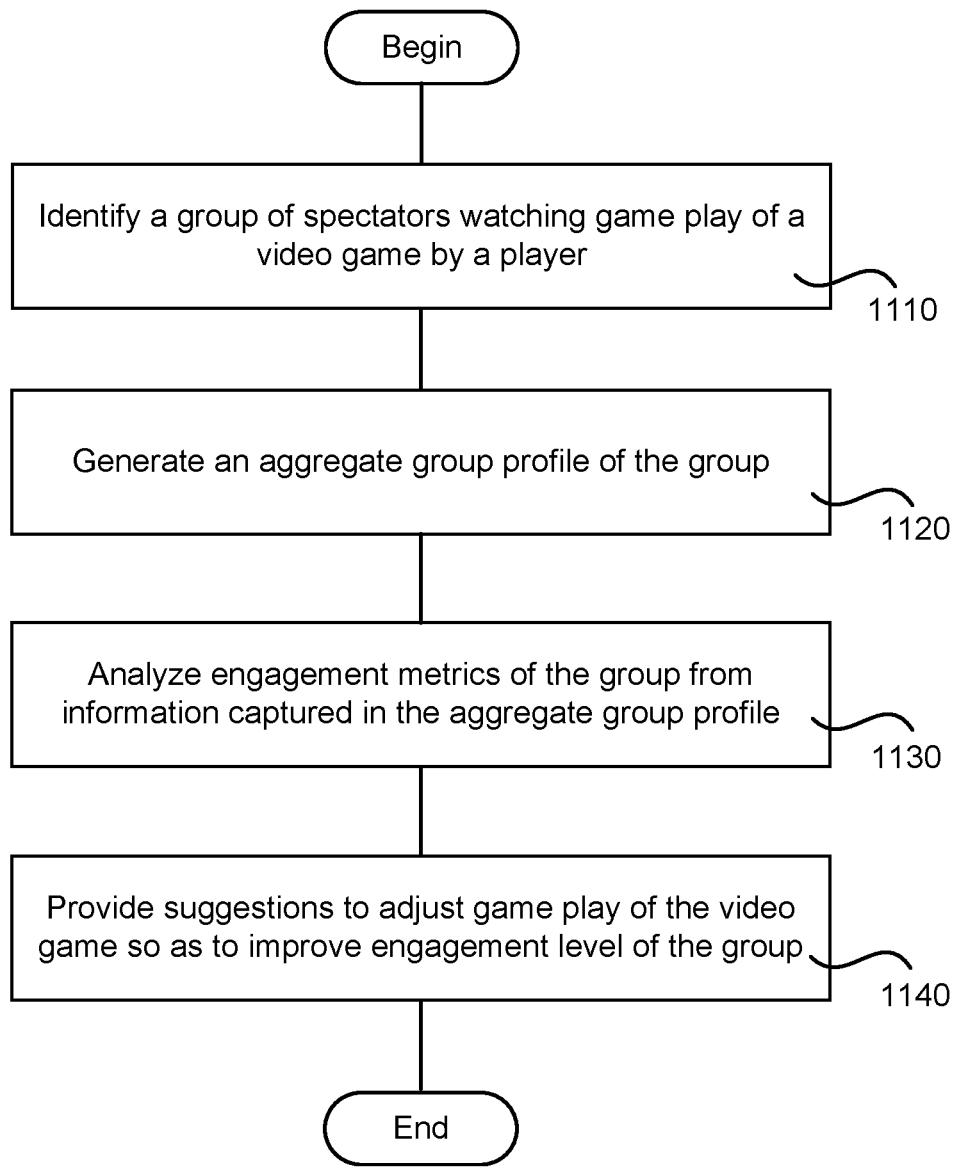
FIG. 11 illustrates flow operations of a method for providing hints for an video game, in accordance with one implementation of the present disclosure.

FIG. 11 illustrates a flow chart of operations for improving the engagement level of a group of spectators engaged in watching game play of a player, in one implementation. The method begins at operation 1110 with the identification of a group of spectators watching a game play of a video game of a player. The group of spectators may be accessing the game play of the player from same geolocation as the player or may be accessing the game play from different geolocations. In response to identifying a group of spectators, a prediction engine executing on a game cloud server generates an aggregate group profile of the group, as illustrated in operation 1120. The aggregate group profile may be generated using the profile of the spectators forming the group. In addition to the profile, the aggregate group profile of the spectator group may also include engagement metrics of the group of spectators. The engagement metrics of the group may be obtained by gathering interactions of each of the spectators in the group from sensors and input devices associated with the respective client devices of the spectators. The interactions may include movements of the spectators and/or inputs provided by the spectators during game play of the player. The inputs may be related or not related to game play of the video game and may include comments, messages, emails, chats, or interactions at different interactive applications other than the video game.

The engagement metrics of the group of spectators is analyzed, as illustrated in operation 1130. The analysis is done to identify engagement level of the spectators toward the game play of the video game. The various interactions captured by the one or more sensors and/or input devices at the respective client devices of the spectators and considered for generating the engagement metrics of the group, are analyzed to determine if the spectators are focused in the game play or are distracted. In some implementations, the spectators interactions may be contextual in nature or expressive in nature. Contextual interactions may be provided via input devices and expressive interactions may be captured by one or more sensors and/or image capturing devices. For example, contextual interactions may include comments/chats/messages related to the video game, related to game play of the video game, related to game play of the player, etc. Expressive interactions may include expressions on the spectators faces, or images of the spectators (e.g., eyes, face, body, etc.). These interactions are analyzed to determine the interest or disinterest of the spectators. For example, the spectators constant interactions with other applications, such as social media applications, email applications, chat/messaging applications, etc., providing comments, messages, etc., not related to the video game or the game play of the player may indicate disinterest. Whereas interactions with social media applications, email applications, chat/messaging applications, etc., providing comments related to the video game, game play of the player, etc., may indicate interest in the game play of the player. Similarly, certain expressions (e.g., happy, focused, etc.,) or spectators movement causing the spectator's focus toward the display screen of the respective client device rendering game play of the player would indicate interest, while certain other expressions (e.g., bored, not focused, etc.,) or spectators movements causing the spectator's focus away from the display screen of the client devices rendering game play, would indicate disinterest. The information included in the engagement metrics of the group can be used to determine the engagement level of the group of spectators.

Based on the analysis, a prediction engine executing on the game cloud server may generate a AI model with engagement metrics of the spectators and game inputs of the player as nodes. The AI model is trained with ongoing game inputs from the player and changes in the engagement metrics of the group. The group of spectators may be dynamic in nature as some spectators may choose to leave the group after watching the game play of the player for some time, while some other spectators may join the group. The changes in the spectators in the group would cause a corresponding change in the engagement metrics of the group. The prediction engine monitors the constitution of the group and adjusts the engagement metrics of the group accordingly. Output from the AI model is used to provide suggestions for adjusting the game play of the video game, so as to improve engagement level of the group of spectators, as illustrated in operation 1140. The output may be used to provide suggestions to achieve the objective of improving the engagement level of the group of spectators. The training of the AI model to provide corresponding output for use in suggesting adjustment to the game play may continue as long as the game play session is active.

Figure 12:
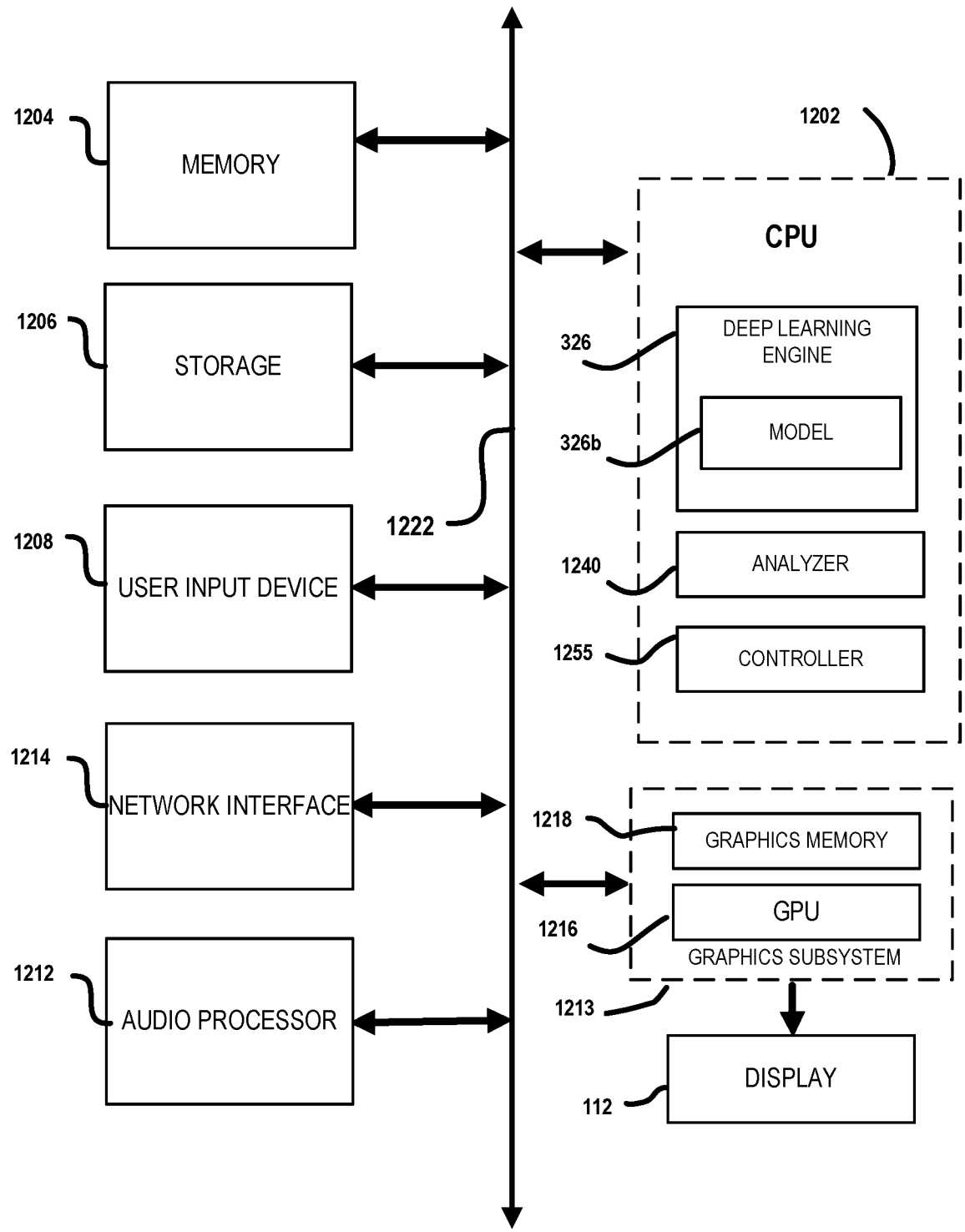
FIG. 12 illustrates components of an example server computing device used for building and training a prediction model (i.e., an artificial intelligence (AI) model) using a model training algorithm, in accordance with one implementation of the present disclosure.

FIG. 12 illustrates components of an example game cloud server 301 that can be used to perform aspects of the various embodiments of the present disclosure. For example, FIG. 12 illustrates an exemplary server system with hardware components suitable for training an AI model that is capable of performing various functionalities in relation to a video game and/or game plays of the video game, in accordance with one embodiment of the present disclosure. The block diagram of the server system includes a server 301 that can incorporate or can be a personal computer, a server computer, gaming console, mobile device, or other digital device, each of which is suitable for practicing an embodiment of the invention. Alternatively, the functionalities of the server 301 could be implemented in a physical server or on a virtual machine or a container server. Server 301 includes a central processing unit (CPU) 1202 for running software applications and optionally an operating system. CPU 1202 may be comprised of one or more homogeneous or heterogeneous processing cores.

In accordance with various embodiments, CPU 1202 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 1202 may be configured to include the machine learning algorithm 326 (also referred to herein as AI engine or deep learning engine) that is configured to support and/or perform learning operations with regards to providing various functionalities (e.g., predicting, suggesting) in relation to a video game and/or game plays of the video game. The deep learning engine 326 may include classifiers 326a that are configured for building and/or training an AI model 326b using inputs and interactions provided during game play of a video game. The AI model 326b is configured to provide suggestions for improving engagement metrics of a group of spectators of the video game and/or game plays of the video game. Further, the CPU 1202 includes an analyzer 1240 that is configured for analyzing the inputs and interactions and providing the results of the analysis for generating and training the AI model 326b. The trained AI model 326b provides an output in response to a particular set of players' inputs, spectators interactions, wherein the output is dependent on the predefined functionality of the trained AI model 326b. The trained AI model 326b may be used to determine the optimal suggestions to the player and/or the game logic for improving the engagement metrics of the spectators in order to meet the engagement criteria defined for the video game. The analyzer 1240 is configured to perform various functionalities in relation to the video game and/or game plays of the video game, including analyzing the output from the trained AI model 326b for a given input (e.g., controller input, game state data, success criteria), and provide a suggestion.

Memory 1204 stores applications and data for use by the CPU 1202. Storage 1206 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1208 communicate players inputs and spectator interactions from one or more players, spectators to server 301. Examples of user input devices 1208 may include keyboards, mice, joysticks, touch pads, touch screens, still or video recorders/cameras, game controllers 1255, and/or microphones. Network interface 1214 allows server 301 to communicate with other computer systems via an electronic communications network, and may include wired or wireless communication over local area networks and wide area networks such as the internet. An audio processor 1212 is adapted to generate analog or digital audio output from instructions and/or data provided by the CPU 1202, memory 1204, and/or storage 1206. The components of server 301, including CPU 1202, memory 1204, data storage 1206, user input devices 1208, network interface 1214, and audio processor 1212 are connected via one or more data buses 1222.

A graphics subsystem 1213 is further connected with data bus 1222 and other components of the server 301. The graphics subsystem 1213 includes a graphics processing unit (GPU) 1216 and graphics memory 1218. Graphics memory 1218 includes a display memory (e.g., a frame buffer) used for storing pixel data for each pixel of an output image. Graphics memory 1218 can be integrated in the same device as GPU 1216, connected as a separate device with GPU 1216, and/or implemented within memory 1204. Pixel data can be provided to graphics memory 1218 directly from the CPU 1202. Alternatively, CPU 1202 provides the GPU 1216 with data and/or instructions defining the desired output images, from which the GPU 1216 generates the pixel data of one or more output images. The data and/or instructions defining the desired output images can be stored in memory 1204 and/or graphics memory 1218. In an embodiment, the GPU 1216 includes 3D rendering capabilities for generating pixel data for output images from instructions and data defining the geometry, lighting, shading, texturing, motion, and/or camera parameters for a scene. The GPU 1216 can further include one or more programmable execution units capable of executing shader programs. In one embodiment, GPU 1216 may be implemented within AI engine to provide additional processing power, such as for the AI or deep learning functionality.

The graphics subsystem 1213 periodically outputs pixel data for an image from graphics memory 1218 to be displayed on display screen (display device associated with a client device) 112, or to be projected by projection system (not shown). Display device 112 can be any device capable of displaying visual information in response to a signal from the server 301, including CRT, LCD, plasma, and OLED displays. Server 301 can provide the display device 112 with an analog or digital signal, for example.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

The invention claimed is:

1. A method, comprising:
   identifying a group of spectators that are watching game play of a video game, the video game generating streaming data based on input provided by a player, the streaming data from the game play being transmitted to a plurality of client devices associated with the group of spectators for rendering;
   generating an aggregate group profile of the group of spectators watching the game play of the video game, the aggregate group profile capturing engagement metrics of the spectators in the group of spectators;
   analyzing the engagement metrics of the spectators in the group, the analyzing performed to identify engagement level of the group of spectators toward the game play of the video game; and
   providing suggestion to adjust game play of the video game so as to improve engagement level of the group of spectators toward the game play of the player of the video game, the suggestion provided in response to detecting waning interest of the group of spectators toward the game play of the player,
   wherein operations of the method are performed by a processor of a game cloud server.

2. The method of claim 1, wherein composition of the group of spectators changes dynamically over time, and the aggregate group profile is dynamically adjusted to correspond with changes detected in the composition of the group of spectators, and
   wherein the spectators forming the group are co-located or remotely located from the player and accessing the game play of the player.

3. The method of claim 1, wherein the suggestion is directed to the player and is dynamically adjusted based on changes detected in the aggregate group profile of the group, the changes detected in the aggregate group profile correspond with changes detected in composition of spectators forming the group of spectators.

4. The method of claim 1, wherein the aggregate group profile is generated from spectator profile of each spectator in the group of spectators.

5. The method of claim 4, wherein the spectator profile includes one or more attributes of each spectator related to the game play of the video game, the one or more attributes of each spectator is determined from information captured using one or more sensors or from interactions provided at the respective client devices, wherein the one or more sensors are associated with the respective client devices of the spectators used to access the streaming data of the video game.

6. The method of claim 1, wherein the aggregate group profile is used to identify preferences of the group of spectators relating to a type of game play of the video game.

7. The method of claim 1, wherein analyzing of the engagement metrics is performed by building a model using machine learning logic, the model being dynamically trained from inputs from the player and interactions related to the game play of the video game received from the one or more spectators from the group of spectators.

8. The method of claim 1, wherein the suggestion is provided as an interactive dashboard.

9. The method of claim 8, wherein the interactive dashboard includes tabs or links to access one or more profile attributes of the aggregate group profile of the group of spectators, or suggested move for the player, wherein the profile attributes include one or more of demographics of the group, or game actions preferences of the group, or game type preferences of the group, or geolocation of the spectators in the group, or engagement level of the group.

10. The method of claim 8, wherein the interactive dashboard is integrated within a game application programming interface (API), the interactive dashboard includes tabs or links to access one or more profile attributes of the aggregate group profile of the group of spectators and suggested move for the player, the game API configured to manage access to the tabs or links included in the interactive dashboard.

11. The method of claim 8, wherein the interactive dashboard is provided as a screen overlay, and wherein the screen overlay is rendered in a specific zone defined on a display screen of the client device of the player, where in the specific zone is determined by game logic of the video game so as to not interrupt with game play of the player.

12. The method of claim 1, wherein the suggestion is provided to the player and includes a request to perform certain actions or follow a specific sequence of actions during game play of the video game, the suggestion being provided based on interactions from one or more spectators in the group.

13. The method of claim 1, wherein the suggestion is provided to the player and includes a request to switch from the video game to a different video game, the request received from a prediction engine executing the machine learning logic on the game cloud server, the different video game identified based on the aggregate group profile of the group of spectators currently following game play of the video game.

14. The method of claim 1,
wherein providing suggestions further includes,
responsively sending a signal to a game logic of the video game to dynamically inject one or more non-player entities into gaming environment of the video game during game play, the one or more non-player entities selected to provide additional challenges for the player, the additional challenges provided to improve the engagement level of the group.

15. The method of claim 1,
wherein providing suggestions further includes,
responsively providing additional content with streaming data of the video game, the additional content being associated with one or more frames of the streaming data of the video game, the one or more frames identified based on context of the streaming data, the additional content selected to be contextually relevant or related to a game scene rendered in the one or more frames.

16. The method of claim 15, wherein the additional content is provided as content overlay.

17. The method of claim 15, wherein the additional content is one of a sponsored content, or statistics related to game play of the video game collected over a period of time from various game play sessions of the player or plurality of other players, or information related to the video game, or information related to spectators in the group, or information related to the player, and
wherein the additional content is rendered on a specific zone defined on a display screen of the client devices associated with the group of spectators.

18. The method of claim 17, wherein the sponsored content is customized based on demographics of the group of spectators watching the game play of the video game.

19. The method of claim 1, wherein providing suggestions includes,
sending a signal to a game logic of the video game to dynamically inject additional content within gaming environment of the video game, wherein the additional content is associated with one or more frames of the streaming data so as to render during rendering of the one or more frames during the game play.

20. The method of claim 1, wherein providing suggestions further includes,
identifying a feature of game play or an event of the video game and providing a voting system interface for the group of spectators to enable voting on an aspect of the feature or the event identified in the video game.

21. A system for improving engagement metrics of a group of spectators watching game play of a video game of a player, comprising:
a server configured to execute an instance of the video game and to generate frames of data for transmitting to one or more client devices;
an encoder configured to receive the frames of data of the video game and encode the frames of data for transmission, in accordance to specifications of a communication channel established between the server and respective ones of the client devices associated with the group of spectators and the player, the encoded frames of data transmitted to the client devices for rendering; and
a prediction engine executing on the server and configured to,
generate an aggregate group profile of the group of spectators watching the game play of the video game, the aggregate group profile capturing engagement metrics of the spectators in the group;
analyze the engagement metrics of the spectators in the group using machine learning logic of the prediction engine, wherein analyzing of the engagement metrics used to identify engagement level of the group toward the game play of the video game; and
provide suggestion to adjust game play of the video game so as to improve engagement level of the group of spectators toward the game play of the player of the video game, the suggestion provided in response to detecting waning interest of the group of spectators toward the game play of the player.

22. The system of claim 21, wherein the prediction engine is configured to receive information captured using one or more sensors or one or more input devices associated with the client devices of the spectators, the information used in identifying one or more attributes of the spectators related to game play of the player, the one or more attributes of the spectators used to define engagement metrics of the group, wherein the engagement metrics is used for generating the aggregate group profile.

23. The system of claim 21, wherein the prediction engine is configured to analyze the engagement metrics and build a model using machine learning logic, the model being dynamically trained with inputs from the player and interactions related to the game play of the video game received from one or more spectators of the group of spectators, output from the model used to provide suggestions.

24. The system of claim 21, wherein the prediction engine is configured to provide suggestions to the player, the suggestions directing the player to perform certain actions or follow a specific sequence of actions during game play of the video game.

25. The system of claim 21, wherein the prediction engine is configured to provide suggestions to the player, the suggestions directing the player to switch from the video game to a different video game, the different video game identified based on the aggregate group profile of the group of spectators currently following game play of the video game.

26. The system of claim 21, wherein the prediction engine is configured to send a signal to a game logic of the video game to dynamically inject one or more non-player entities into gaming environment of the video game during game play, the signal being sent in response to detecting the engagement level of the group of spectators toward the game play is diminishing, the one or more non-player entities selected to provide additional challenges for the player, so as to improve the engagement level of the group.

27. The system of claim 21, wherein the prediction engine is configured to identify and provide additional content for inclusion with streaming data of the video game, in response to detecting the engagement level of the group of spectators toward the game play is diminishing, the additional content associated with one or more frames of the streaming data of the video game so as to be rendered when rendering the one or more frames of the streaming data, the additional content selected to be contextually related to a game scene rendered in the one or more frames.

28. A method, comprising:
identifying a group of spectators that are watching game play of a video game, the video game generating streaming data based on input provided by a player, the streaming data from the game play transmitted to client devices associated with the group of spectators for rendering;
generating an aggregate group profile of the group of spectators watching the game play of the video game, the aggregate group profile capturing engagement metrics of the spectators in the group of spectators;
analyzing the engagement metrics of the spectators in the group by building a model using machine learning logic, the analyzing performed to identify engagement level of the group toward the game play of the video game; and
providing suggestion to adjust game play of the video game so as to improve engagement level of the group toward the game play of the video game, the suggestion provided in response to detecting waning interest of the group of spectators toward the game play of the player,
wherein operations of the method are performed by a processor of a game cloud server.

29. The method of claim 28, wherein the model is dynamically trained from inputs of the player and interactions related to the game play of the video game received from the one or more spectators from the group of spectators.

* * * * *